US012638689B2

(12) United States Patent
Won et al.

(10) Patent No.: US 12,638,689 B2
(45) Date of Patent: May 26, 2026

(54) DISPLAY APPARATUS PROVIDING IMAGE WITH IMMERSIVE SENSE

(71) Applicant: SAMSUNG ELECTRONICS CO., LTD., Suwon-si (KR)

(72) Inventors: Kwanghyun Won, Suwon-si (KR); Hyungki Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 18/222,136

(22) Filed: Jul. 14, 2023

(65) Prior Publication Data

US 2024/0069355 A1 Feb. 29, 2024

Related U.S. Application Data

(63) Continuation of application No. PCT/KR2023/009740, filed on Jul. 10, 2023.

(30) Foreign Application Priority Data

Aug. 25, 2022 (KR) ........................ 10-2022-0107183
Nov. 18, 2022 (KR) ........................ 10-2022-0155800

(51) Int. Cl.
*G02B 27/28* (2006.01)
*G02B 17/08* (2006.01)

(52) U.S. Cl.
CPC ........... *G02B 27/283* (2013.01); *G02B 17/08* (2013.01)

(58) Field of Classification Search
CPC .... G02B 27/01; G02B 27/017; G02B 27/026; G02B 27/0101; G02B 27/0103;
(Continued)

(56) References Cited

U.S. PATENT DOCUMENTS 10,459,230 B2 10/2019 Haseltine et al.
10,768,442 B1 * 9/2020 Dehkordi ........... G02B 27/0101
(Continued)

FOREIGN PATENT DOCUMENTS

KR          10-1866683 B1    6/2018
KR     10-2020-0032895 A     3/2020
(Continued)

OTHER PUBLICATIONS

International Search Report and Written Opinion dated Oct. 23, 2023, issued by the International Searching Authority in International Application No. PCT/KR2023/009740 (PCT/ISA/220, PCT/ISA/210, and PCT/ISA/237).
(Continued)

*Primary Examiner* — Sultan Chowdhury
(74) *Attorney, Agent, or Firm* — Sughrue Mion, PLLC

(57) ABSTRACT

A display apparatus includes an image forming device configured to provide image light; a concave mirror configured to focus the image light provided by the image forming device; and a delivery optical system configured to deliver the image light provided by the image forming device to a field of view of an observer via the concave mirror, wherein the delivery optical system may include a beam splitter and at least one polarization control optical element, and wherein the at least one polarization control optical element is configured to block noise light incident to the delivery optical system from the field of view of the observer.

19 Claims, 26 Drawing Sheets

(58) Field of Classification Search

CPC ............ G02B 27/0107; G02B 27/0977; G02B 27/0983; G02B 27/0114; G02B 27/0125; G02B 27/0172; G02B 27/0178; G02B 27/10; G02B 27/283; G02B 27/1006; G02B 17/00; G02B 17/0605; G02B 17/061; G02B 17/08; G02B 17/0804

See application file for complete search history.

(56) References Cited

U.S. PATENT DOCUMENTS

| | | | |
|---|---|---|---|
| 10,989,926 B1 * | 4/2021 | Matsuda | G02B 27/283 |
| 11,042,040 B2 | 6/2021 | Xiao et al. | |
| 11,067,819 B2 | 7/2021 | Cho et al. | |
| 11,553,171 B2 | 1/2023 | Mok et al. | |
| 2017/0269428 A1 | 9/2017 | Otani et al. | |
| 2018/0067315 A1 | 3/2018 | Amitai et al. | |
| 2019/0219818 A1 * | 7/2019 | Mattinson | G02B 27/283 |
| 2021/0109343 A1 * | 4/2021 | Gao | G02B 26/0833 |
| 2021/0199962 A1 | 7/2021 | Chen et al. | |
| 2021/0199969 A1 | 7/2021 | Chen et al. | |
| 2021/0208400 A1 * | 7/2021 | Hong | G02B 27/283 |
| 2021/0208420 A1 | 7/2021 | Kim et al. | |
| 2021/0294118 A1 | 9/2021 | Dehkordi | |
| 2021/0382304 A1 | 12/2021 | You et al. | |
| 2022/0397862 A1 | 12/2022 | Karafin et al. | |

FOREIGN PATENT DOCUMENTS

| | | |
|---|---|---|
| KR | 10-2020-0118492 A | 10/2020 |
| KR | 10-2021-0090508 A | 7/2021 |
| KR | 10-2021-0152625 A | 12/2021 |
| KR | 10-2022-0031850 A | 3/2022 |
| KR | 10-2022-0099556 A | 7/2022 |

OTHER PUBLICATIONS

Pezzaniti, J., L., et al., "Four Camera Complete Stokes Imaging Polarimeter", Polarization: Measurement, Analysis, and Remote Sensing VIII, Proc. of SPIE vol. 6972 69720J-8, (2008), doi: 10.1117/12.784797, 12 pages.

Optical isolator, Wikipedia the Free Encyclopedia, 4 pages. https://en.wikipedia.org/wiki/Optical_isolator.

* cited by examiner

1

DISPLAY APPARATUS PROVIDING IMAGE WITH IMMERSIVE SENSE

CROSS-REFERENCE TO RELATED APPLICATIONS

This application is by-pass continuation application of International Application No. PCT/KR2023/009740, filed on Jul. 10, 2023, which based on and claims priority to Korean Patent Application No. 10-2022-0107183, filed on Aug. 25, 2022, in the Korean Intellectual Property Office, and to Korean Patent Application No. 10-2022-0155800, filed on Nov. 18, 2022, in the Korean Intellectual Property Office the disclosures of which are incorporated by reference herein in their entireties.

TECHNICAL FIELD

The disclosure relates to an immersive display apparatus.

BACKGROUND ART 3D image display technology is applied to various fields, and recently, also to image apparatuses related to virtual reality (VR) and augmented reality (AR).

A virtual reality device may be implemented as a wearable device, such as a glasses type, head mount type, or goggle type, or may be implemented as anon-wearable device.

The immersive sense that a user watching an image experiences may be affected by surrounding environments such as illuminance, and methods for reducing such an effect are being sought.

DESCRIPTION OF EMBODIMENTS

Solution to Problem

According to an aspect of the disclosure, a display apparatus includes: an image forming device configured to provide image light; a concave mirror configured to focus the image light provided by the image forming device; and a delivery optical system configured to deliver the image light provided by the image forming device to a field of view of an observer via the concave mirror, wherein the delivery optical system may include a beam splitter and at least one polarization control optical element, and wherein the at least one polarization control optical element is configured to block noise light incident to the delivery optical system from the field of view of the observer.

The image light provided by the image forming device may have a first polarization state which is linear polarization in a first direction.

The beam splitter may be obliquely disposed with respect to a travel path of the image light from the image forming device, and the at least one polarization control optical element may include: a first quarter wave plate between the beam splitter and at least one of the image forming device or the concave mirror; and a polarizer between the beam splitter and the observer.

The beam splitter may include a half mirror.

The at least one polarization control optical element may further include a second quarter wave plate between the beam splitter and the observer.

The polarizer may be configured to transmit light of the first polarization state and to block light of a second polarization state, which is perpendicular to the first polarization state.

The first quarter wave plate may be between the image forming device and the beam splitter, and parallel to the image forming device.

The first quarter wave plate may be parallel to the beam splitter.

The first quarter wave plate may be between the beam splitter and the concave mirror, and an optical axis of the first quarter wave plate may be parallel to an optical axis of the concave mirror.

The second quarter wave plate and the polarizer may be disposed at an angle of less than 15 degrees with respect to the beam splitter.

The at least one polarization control optical element may further include a phase retarder between the concave mirror and the beam splitter.

The polarizer may be further configured to: transmit light of a second polarization state that is perpendicular to the first polarization state, and block light of the first polarization state.

The first quarter wave plate may be between the beam splitter and the concave mirror, and an optical axis of the first quarter wave plate may be parallel to an optical axis of the concave mirror.

The beam splitter may include a polarization beam splitter that is obliquely disposed with respect to a travel path of the image light from the image forming device, the polarization beam splitter being configured to reflect light of the first polarization state, and transmit light of a second polarization state that is perpendicular to the first polarization state, and the delivery optical system may include: a first quarter wave plate between the polarization beam splitter and the concave mirror; and a polarizer between the polarization beam splitter and the observer.

The image forming device may be further configured to provide the image light in an unpolarized state, the beam splitter may be obliquely disposed with respect to a travel path of the image light from the image forming device, and the at least one polarization control optical element may include: a polarizer between the beam splitter and the observer; and a second quarter wave plate between the beam splitter and the polarizer.

The display apparatus may further include a privacy film between the image forming device and the delivery optical system.

The display apparatus may further include an anti-reflection film between the delivery optical system and the observer.

The noise light may be light that is incident from the observer toward the delivery optical system and incident from at least one of the observer and an opposite side of the image forming device.

Advantageous Effects of Disclosure

According to one or more embodiments, a display apparatus may provide an image with increased immersive sense by blocking various types of noise that may occur due to ambient illuminance.

According to one or more embodiment, the display apparatus described above may be implemented as a wearable type or a non-wearable type.

BRIEF DESCRIPTION OF DRAWINGS

The above and other aspects, features, and advantages of certain embodiments of the present disclosure will be more apparent from the following description taken in conjunction with the accompanying drawings, in which.

MODE OF DISCLOSURE

Figure 1:
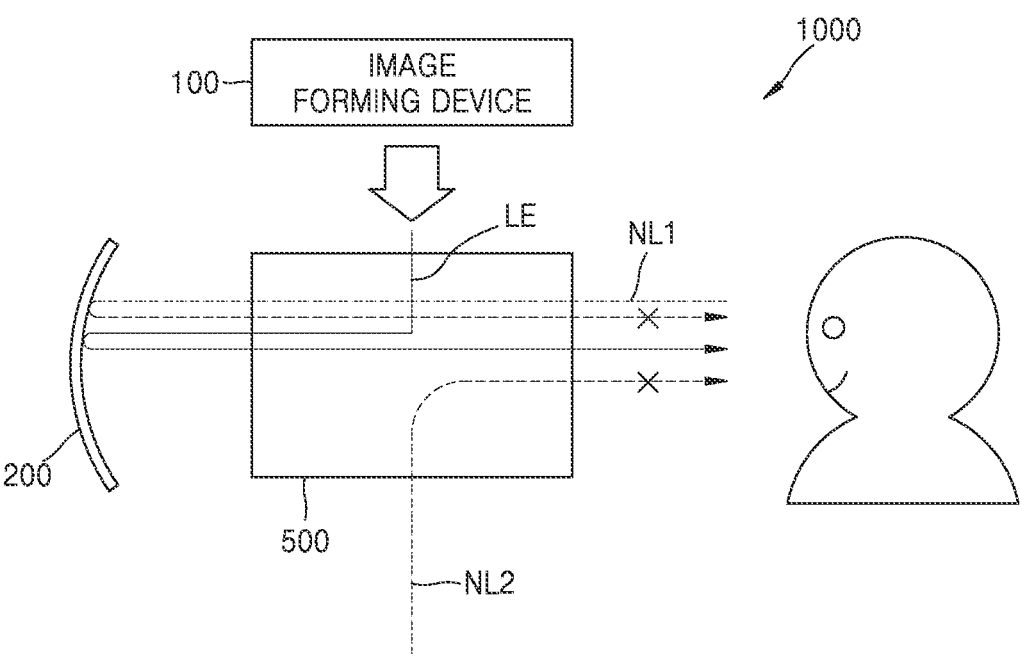
FIG. 1 is a conceptual diagram for describing an optical path through which a display apparatus according to one or more embodiments delivers image light to the field of view of an observer.

Throughout the disclosure, the expression "at least one of a, b or c" indicates only a, only b, only c, both a and b, both a and c, both b and c, or all of a, b, and c.

Hereinafter, embodiments of the disclosure will be described in detail with reference to the accompanying drawings such that one of ordinary skill in the art may easily implement the disclosure. However, the disclosure may be implemented in various different forms and is not limited to the embodiments described herein. Also, in the drawings, parts irrelevant to the description are omitted in order to clearly describe the disclosure, and like reference numerals designate like elements throughout the specification.

Throughout the specification, it will also be understood that when a portion is referred to as being "connected to" another portion, it can be directly connected to the other portion, or it can be electrically connected to the other portion and intervening elements may be present. In addition, when a portion "includes" a certain element, the portion may further include another element instead of excluding the other element, unless otherwise stated.

Also, in the specification, the terms such as "units" denote units or that process at least one function or operation, and may be realized by hardware, software, or a combination of hardware and software The terms used in this specification are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the detailed meaning thereof will be described in the detailed description of the disclosure. Thus, the terms used in the specification should be understood not as simple names but based on the meaning of the terms and the overall description of the disclosure.

FIG. 1 shows an optical path through which a display apparatus 1000 according to one or more embodiment delivers image light LE to the field of view of an observer.

A display apparatus 1000 includes an image forming device 100 providing image light LE, a concave mirror 200 focusing the image light provided by the image forming device 100, and a delivery optical system 500 which delivers the image light LE provided by the image forming device 100 to the field of view of an observer via the concave mirror 200.

The delivery optical system 500 may include a beam splitter and one or more polarization control optical elements. The beam splitter and the one or more polarization control optical elements included in the delivery optical system 500 may be configured to allow the delivery optical system 500 to deliver the image light LE to the field of view of the observer, and to reduce or block noise light other than the image light LE from the observer as much as possible.

Noise light may be generated by ambient illuminance in an environment in which the observer views an image. For example, the noise light may include first noise light NL1 of an optical path such than an image of an observer is incident on the delivery optical system 500, is reflected by the concave mirror 200, and enters the field of view of the observer. Alternatively, the noise light may include second noise light NL2 of an optical path such that an image of a table on which the display apparatus 1000 is installed or an image of a floor near the display apparatus 1000 enters the field of view of the observer through the delivery optical system 500.

The delivery optical system 500 includes one or more polarization control optical elements provided to prevent such noise light from reaching the field of view of the observer. A polarization control optical element refers to an optical element that exhibits optical performance dependent on the polarization state of incident light. For example, the polarization control optical element collectively refers to a polarizer that transmits only light of a certain polarization, a phase retarder that changes the phase of incident light, a quarter wave plate that changes-polarization by changing the phase by 45 degrees, and the like. By appropriately setting optical properties such as the number or arrangement position of the polarization control optical elements, a direction of a fast axis/slow axis of a quarter wave plate, and a polarization axis of a polarizer, the first noise light NL1, the second noise light NL2 may be blocked as much as possible from the field of view of the observer. Also, in this process, loss of the image light LE by these polarization control optical elements may be prevented as much as possible.

Figure 2:
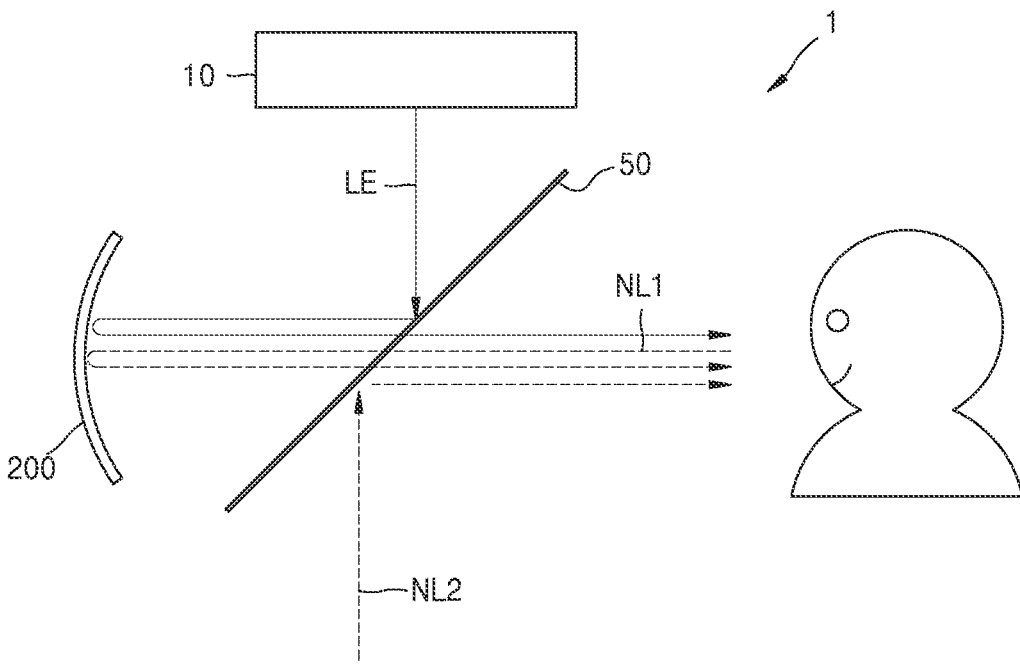
FIG. 2 is a schematic view of a structure of a display apparatus according to one or more embodiments.

FIG. 2 shows a structure of a display apparatus 1 according to one or more embodiment.

A display apparatus 1 according to the comparative example includes an image forming device 10, a beam splitter 50, and a concave mirror 200. The image light LE provided by the image forming device 10 is reflected by the beam splitter 50 and then reaches the concave mirror 200, is focused by the concave mirror 200, and passes through the beam splitter 50 to reach the field of view of an observer. The first noise light NL1 reaches the field of view of the observer, via the beam splitter 50, the concave mirror 200, and the beam splitter 50. The second noise light NL2 is reflected from the beam splitter 50 and also reaches the field of view of the observer.

In this optical path, light loss by the beam splitter 50, which is a half mirror, is equally applied to the image light LE, the first noise light NL1, and the second noise light NL2. That is, there is no effect of selectively further reducing noise light in the display apparatus 1. In other words, noise light generated in an environment of ambient illumination in which the first noise light NL1 and the second noise light NL2 may occur reaches the field of view of the observer together with image light. Accordingly, the immersive sense in respect of viewing an image is reduced.

Unlike the display apparatus 1 of the comparative example, the delivery optical system 500 provided in the display apparatus 1000 of the one or more embodiment may block the first noise light NL1 and the second noise light NL2 as much as possible and deliver the image light LE to the field of view of the observer, thereby increasing the immersive sense of the observer viewing an image.

Hereinafter, display apparatuses according to one or more embodiment in which components of the delivery optical system 500 are implemented in various manners will be described.

Figure 3:
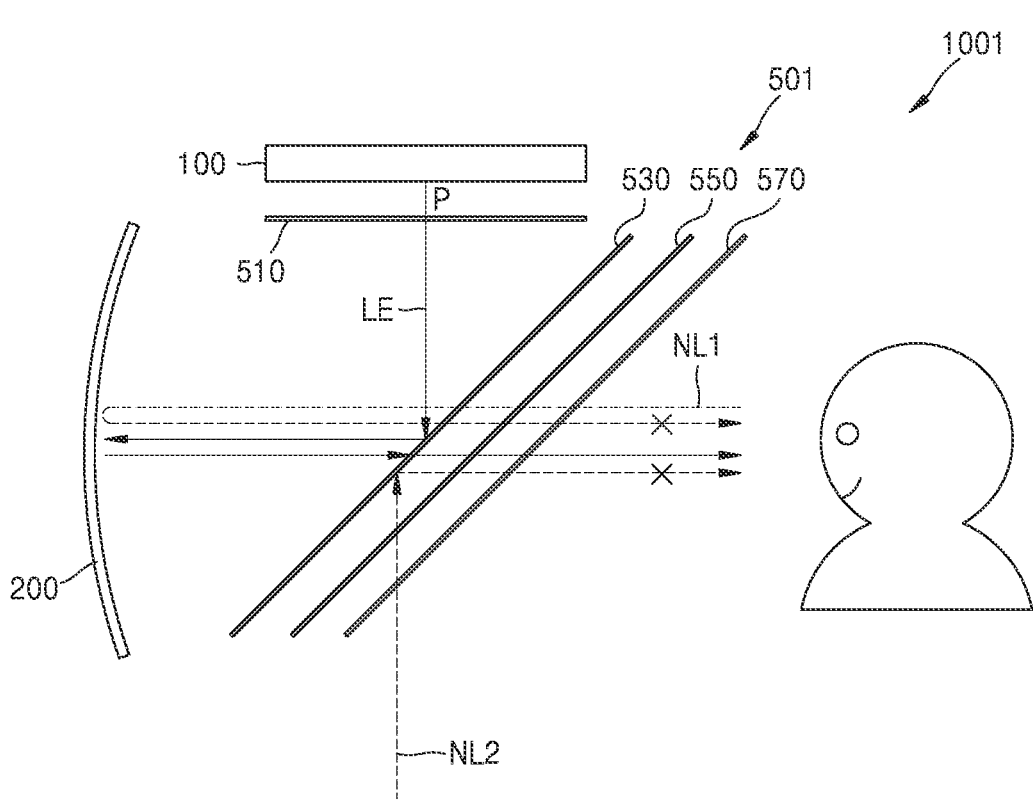
FIG. 3 is a schematic view of a structure of a display apparatus according to one or more embodiments.
Figure 4A:
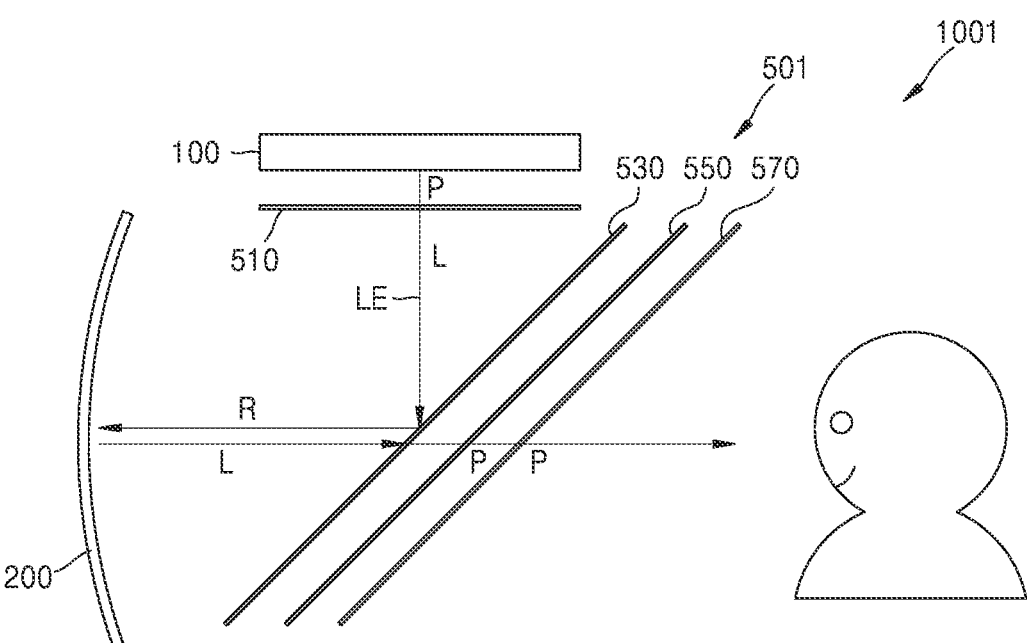
FIG. 4A is a detailed view of an optical path of image light, first noise light, and second noise light, according to the display apparatus of FIG. 3.
Figure 4B:
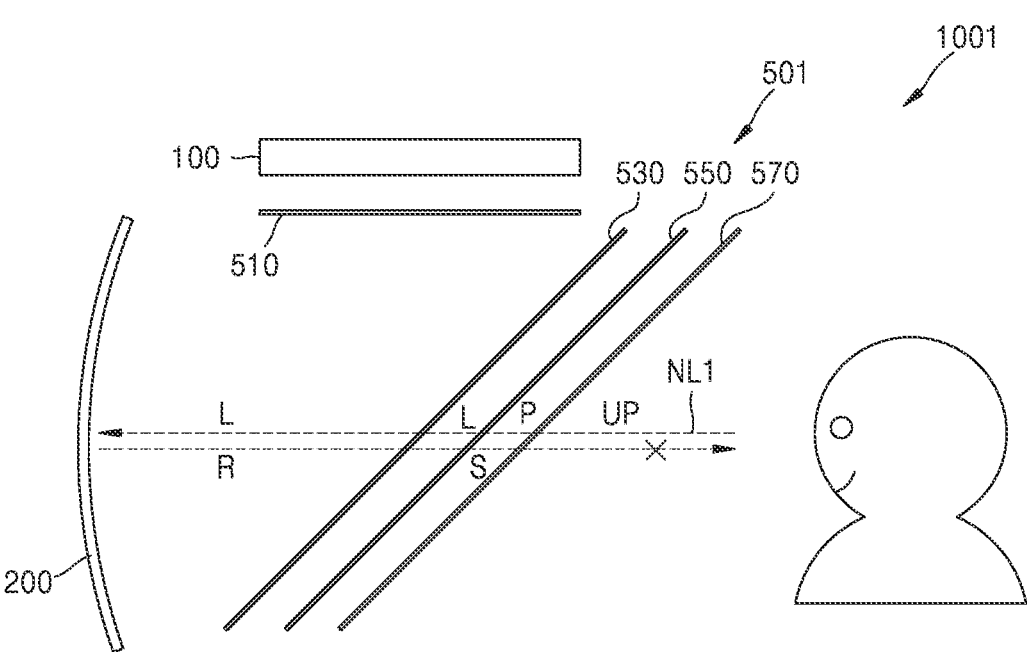
FIG. 4B is a detailed view of an optical path of image light, first noise light, and second noise light, according to the display apparatus of FIG. 3.
Figure 4C:
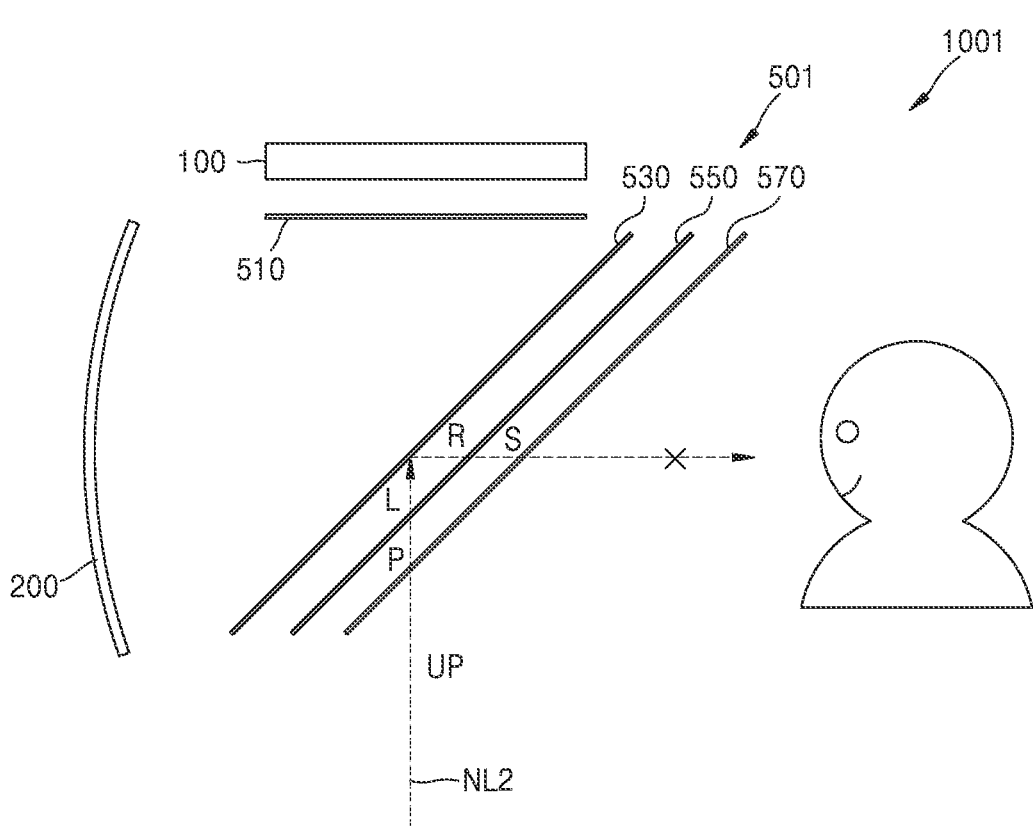
FIG. 4C is a detailed view of an optical path of image light, first noise light, and second noise light, according to the display apparatus of FIG. 3

FIG. 3 shows a schematic view of a structure of a display apparatus 1001 according to one or more embodiment. FIG. 4A, FIG. 4B, and FIG. 4C respectively show views of an optical path of image light LE, first noise light NL1, and second noise light NL2, according to the display apparatus 1 of FIG. 3.

A display apparatus 1001 includes an image forming device 100, a delivery optical system 501, and a concave mirror 200.

The image forming device 100 may include a display device that modulates light according to image information to form image light LE, and one or more optical elements for outputting the image light LE formed in the display device to a certain position.

The type of image formed by the display device provided in the image forming device 100 is not particularly limited, and may be, for example, a 2D image or a 3D image. The 3D image may be, for example, a stereo image, a hologram image, a light field image, or an integral photography (IP) image, and may also be a multi-view or super multi-view image.

The display device may include, for example, a liquid crystal on silicon (LCoS) device, a liquid crystal display (LCD) device, an organic light-emitting diode (OLED) display device, a digital micromirror device (DMD), or next-generation display devices such as a micro LED or a quantum dot (QD) LED. When a display device provided in the image forming device 100 is a non-emission type device such as an LCD, a light source providing light for image formation to the display device may be further included.

The image forming device 100 may include a path conversion member or a lens as an optical element that delivers the image light LE formed by the display device to a certain position. For example, a beam splitter for changing the path of the image light LE, a relay lens for enlarging or reducing the image light, and a spatial filter for removing noise may be included, but the disclosure is not limited thereto, and various optical systems may be used.

In one or more embodiment, the image light LE provided by the image forming device 100 may be in a first polarization state. The first polarization is linear polarization in a certain direction, and may be, for example, P-polarization or S-polarization. P-polarization and S-polarization are linear polarization in directions perpendicular to each other. Hereinafter, the first polarization will be referred to as P-polarization and the second polarization will be referred to as S-polarization. However, this is an example, and the terms may be interchanged with each other.

The concave mirror 200 focuses the image light LE on a virtual plane at a certain distance in front of an observer. The virtual plane is an imaginary focal plane of the concave mirror 200. The concave mirror 200 allows an observer to perceive the image light LE provided by the image forming device 100 as an image from the virtual plane in front of the observer.

The delivery optical system 501 includes a beam splitter 530 arranged obliquely with respect to a traveling path of the image light LE emitted from the image forming device 100, a first quarter wave plate 510 arranged between the image forming device 100 and the beam splitter 530, and a polarizer 570 arranged between the beam splitter 530 and the observer. The delivery optical system 501 may further include a second quarter wave plate 550 arranged between the beam splitter 530 and the observer. The second quarter wave plate 550 may be arranged between the beam splitter 530 and the polarizer 570. The beam splitter 530 may be arranged obliquely with respect to the optical axis of the image light LE provided by the image forming device 100, for example, may be arranged at an angle of 45 degrees. However, the disclosure is not limited thereto. The second quarter wave plate 550 and the polarizer 570 may be arranged in parallel with the beam splitter 530. However, the disclosure is not limited thereto, and the second quarter wave plate 550 and the polarizer 570 may be arranged at a certain angle, for example, an angle of 15 degrees or less, with respect to the beam splitter 530.

The beam splitter 530 may be a half mirror. That is, the beam splitter 530 may transmit half of incident light and reflect the other half of the incident light.

The first quarter wave plate 510 is a phase retarder that retards the phase of incident light by 45 degrees, whereby linear polarization may be converted into circular polarization and circular polarization may be converted into linear polarization. The second quarter wave plate 550 is a phase retarder that retards the phase of incident light by 45 degrees, whereby linear polarization may be converted into circular polarization and circular polarization may be converted into linear polarization.

The first quarter wave plate 510 and the second quarter wave plate 550 may be quarter wave plates in which fast axis directions are perpendicular to each other. For example, the first quarter wave plate 510 has a fast axis direction of 45°, converts P-polarization into left handed circular polarization, and converts S-polarization into right handed circular polarization, and converts left handed circular polarization into S-polarization and right handed circular polarization into P-polarization. The second quarter wave plate 550 has a fast axis direction of −45°, converts P-polarization into right handed circular polarization, converts S-polarization into left handed circular polarization, left handed circular polarization into P-polarization, and right handed circular polarization into S-polarization. The illustrated polarization conversion and the display of fast axis angles are described based on a predetermined view point of light passing through the first quarter wave plate 510 and the second quarter wave plate 550. For example, on a path through which the image light LE emitted from the image forming device 100 passes through the delivery optical system 501 and the concave mirror 200 toward an observer, the illustrated polarization conversion and the display of fast axis angles are based on a view point from which the first quarter wave plate 510, the second quarter wave plate 550 are viewed. When the view point at which light passes through the first quarter wave plate 510 and the second quarter wave plate 550 is changed, that is, when the left and right sides of the fast axis are reversed based on the view point at which light views the first quarter wave plate 510 and the second quarter wave plate 550, the polarization expression is also reversed.

The polarizer 570 may transmit light that is linear polarized in a certain direction and block light that is linear polarized in a direction perpendicular thereto. For example, light of the first polarization, that is, P-polarization, may be transmitted, and light of the second polarization, that is, S-polarization, which is perpendicular thereto, may be absorbed.

Hereinafter, in the drawings, the first polarization and the second polarization are denoted by P and S, respectively, and the left handed circular polarization and the right handed circular polarization are denoted by L and R, respectively.

The delivery optical system 501 may be configured such that the image light LE is delivered to the field of view of the observer via the concave mirror 200, but the first noise light NL1 and the second noise light NL2 are not delivered to the field of view of the observer as much as possible or delivered by a reduced amount as much as possible.

Detailed optical paths of the image light LE, the first noise light NL1, and the second noise light NL2 will be described with reference to FIG. 4A, FIG. 4B, and FIG. 4C.

Referring to FIG. 4A, the image light LE provided by the image forming device 100 in a first polarization P state is converted into a left handed circular polarization L state while passing through a first quarter wave plate 510, and reaches the beam splitter 530. The image light LE is reflected by the beam splitter 530, and reaches the concave mirror 200 in a right handed circular polarization R state. Next, the image light LE is reflected by the concave mirror 200, and the polarization state thereof becomes left handed circular polarization L again and the image light LE transmits through the beam splitter 530. The image light LE of the left handed circular polarization L passes through the second quarter wave plate 550 and is converted into the first polarization P, and passes through the polarizer 570 that transmits light of the first polarization P, and reaches the field of view of the observer.

FIG. 4B shows a path of the first noise light NL1. The first noise light NL1 is in an unpolarization UP state, that is, is light in which various polarization states are mixed. Of the first noise light NL1, only light in the first polarization P state may transmit through the polarizer 570. That is, in this process, a portion of the first noise light NL1 is blocked from the optical path toward the observer. The first noise light NL1 of the first polarization P passes through the second quarter wave plate 550 to be in the left handed circular polarization L state and transmits through the beam splitter 530. Next, the first noise light NL1 in the left handed circular polarization L state is reflected by the concave mirror 200, converted into the right handed circular polarization R state, and transmits through the beam splitter 530. The first noise light NL1 in the right handed circular polarization R state passes through the second quarter wave plate 550 again to be in the second polarization S state. As the polarizer 570 transmits only light of the first polarization P, the first noise light NL1 in the second polarization S state does not transmit through the polarizer 570 and is blocked, and thus does not reach the field of view of the observer.

FIG. 4C shows a path of the second noise light NL2. The second noise light NL2 is also in the unpolarization UP state, that is, is light in which various polarization states are mixed. Of the second noise light NL2, only light in the first polarization P state may transmit through the polarizer 570. That is, in this process, a portion of the second noise light NL2 is blocked from the optical path toward the field of view of the observer. The second noise light NL2 of the first polarization P passes through the second quarter wave plate 550 to be in the left handed circular polarization L state and reaches the beam splitter 530. Next, the second noise light NL2 in the left handed circular polarization L state is reflected by the beam splitter 530 and is converted into the right handed circular polarization R state, and passes through the second quarter wave plate 550 to be in the second polarization S state. As the polarizer 570 transmits only light of the first polarization P, the second noise light NL2 in the second polarization S state does not transmit through the polarizer 570, and thus does not reach the field of view of the observer.

Figure 5:
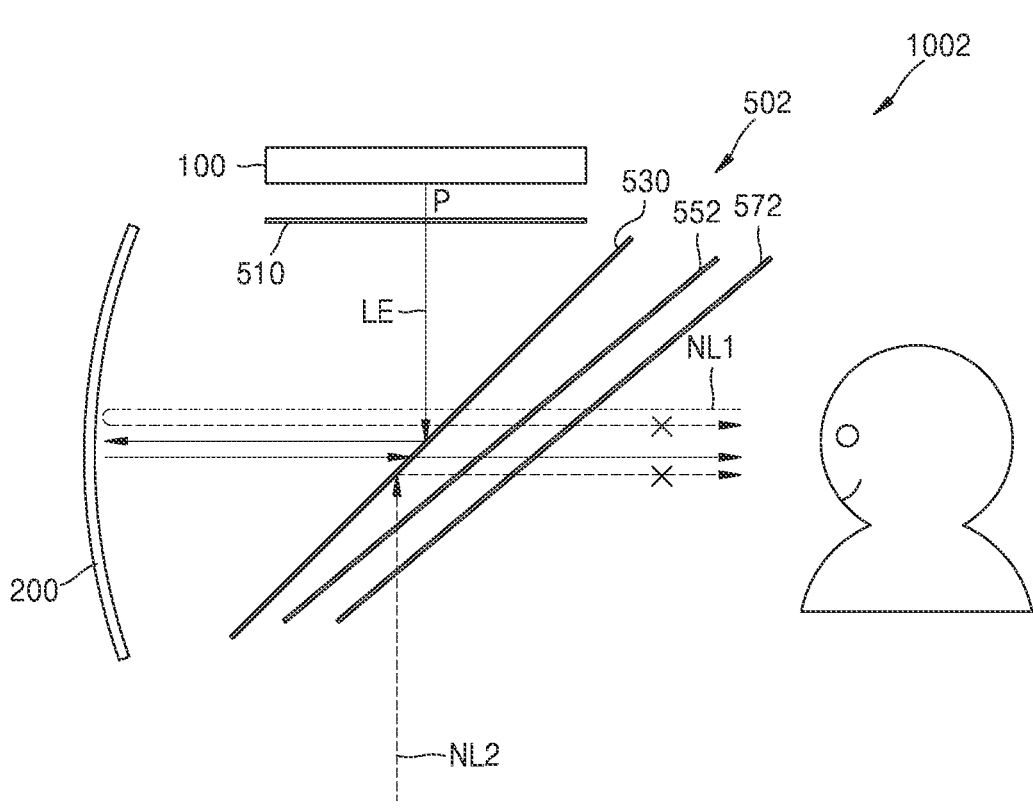
FIG. 5 is a schematic view of a structure of a display apparatus according to one or more embodiments.

FIG. 5 shows a structure of a display apparatus 1002 according to one or more embodiment.

A display apparatus 1002 includes an image forming device 100, a delivery optical system 502, and a concave mirror 200. The display apparatus 1002 according to one or more embodiment differs from the display apparatus 1001 of FIG. 3 in respect of the specific configuration of the delivery optical system 502, and is similar to the display apparatus 1001 of FIG. 3 in that the image light LE reaches the field of view of an observer and the first noise light NL1 and the second noise light NL2 are blocked from the field of view of the observer.

The delivery optical system 502 includes the first quarter wave plate 510, the beam splitter 530, a second quarter wave plate 552, and a polarizer 572. The second quarter wave plate 552 and the polarizer 572 are not parallel to the beam splitter 530 and are inclined at a certain angle. This angle may be, for example, 0 degrees or more and 15 degrees or less, but is not limited thereto.

The arrangement of the second quarter wave plate 552 and the polarizer 572 is to compensate for a polarization error due to a curved surface of the concave mirror 200. A polarization error may occur due to a curved surface provided in the concave mirror 200 in the polarization conversion on the optical path on which the image light LE and the first noise light NL1 pass by the concave mirror 200, as described in FIG. 3, FIG. 4A, and FIG. 4B. Accordingly, the second quarter wave plate 552 and the polarizer 572 may be rotated at a certain angle to compensate for this polarization error, and thus, the image light LE may be delivered to the field of view of the observer and the efficiency of blocking the first noise light NL1 and the second noise light NL2 from the field of view of the observer may be increased.

Figure 6:
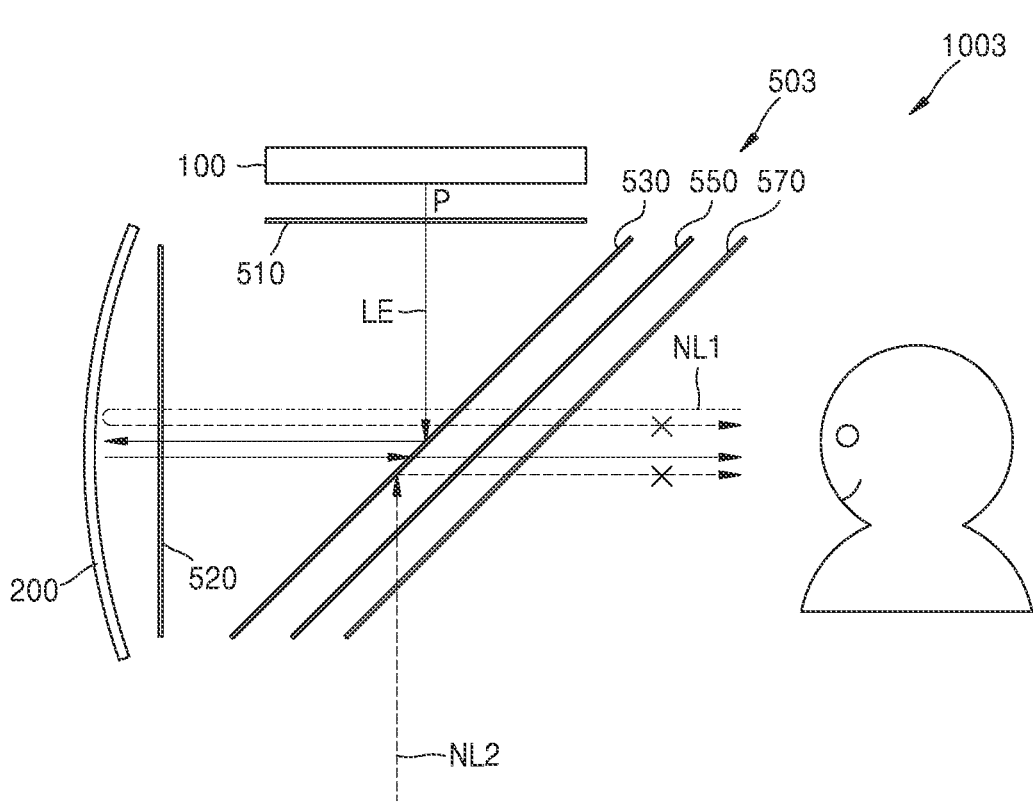
FIG. 6 is a schematic view of a structure of a display apparatus according to one or more embodiments.

FIG. 6 shows a structure of a display apparatus 1003 according to one or more embodiment.

A display apparatus 1003 includes an image forming device 100, a delivery optical system 503, and a concave mirror 200.

The display apparatus 1003 according to one or more embodiment differs from the display apparatus 1001 of FIG. 3 in respect of the specific configuration of the delivery optical system 503, and is similar to the display apparatus 1001 of FIG. 3 in that the image light LE reaches the field of view of an observer and the first noise light NL1 and the second noise light NL2 are blocked from the field of view of the observer.

The delivery optical system 503 includes the first quarter wave plate 510, the beam splitter 530, the second quarter wave plate 550, and the polarizer 570, and also a phase retarder 520 arranged between the concave mirror 200 and the beam splitter 530.

The phase retarder 520 may delay the phase of incident light by a certain angle. The phase retarder 520 compensates for a polarization error caused by the concave mirror 200. A polarization error may occur due to a curved surface provided in the concave mirror 200 in the polarization conversion on the optical path on which the image light LE and the first noise light NL1 pass by the concave mirror 200, as described in FIG. 3, FIG. 4A, and FIG. 4B The phase retarder 520 for delaying the phase of incident light is arranged to compensate for this polarization error, and thus, the image light LE may be delivered to the field of view of the observer, and the efficiency of blocking the first noise light NL1 and the second noise light NL2 from the field of view of the observer may be increased.

Figure 7:
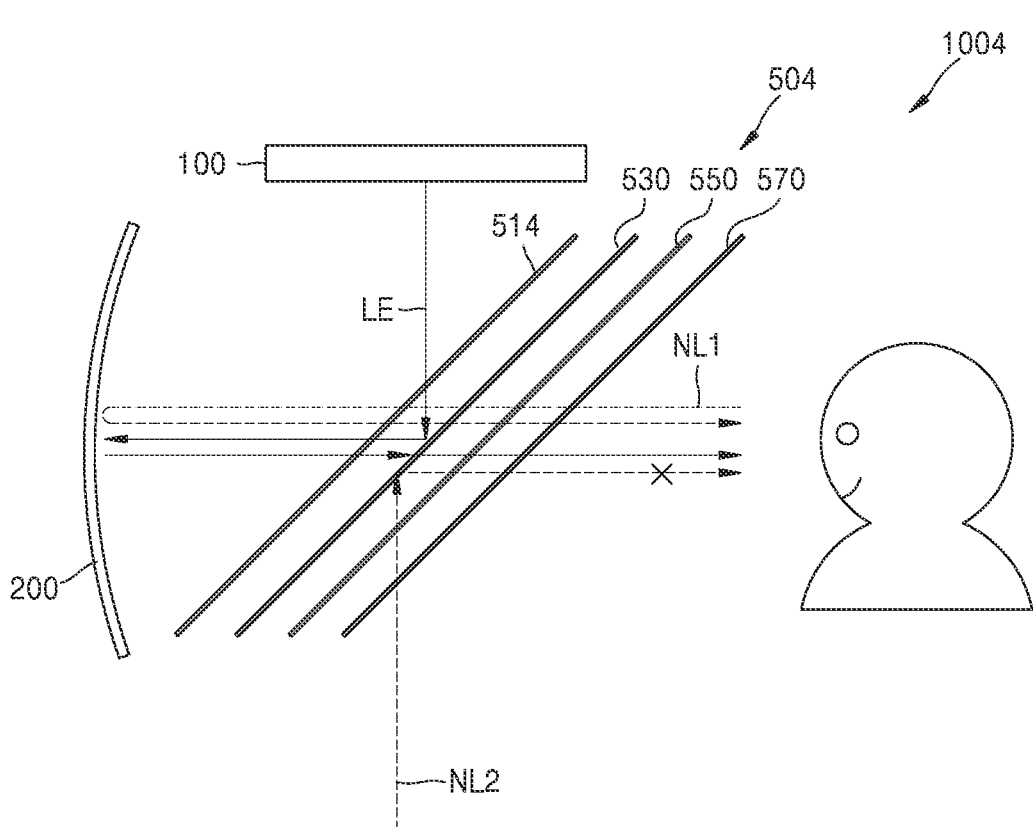
FIG. 7 is a schematic view of a structure of a display apparatus according to one or more embodiments.
Figure 8A:
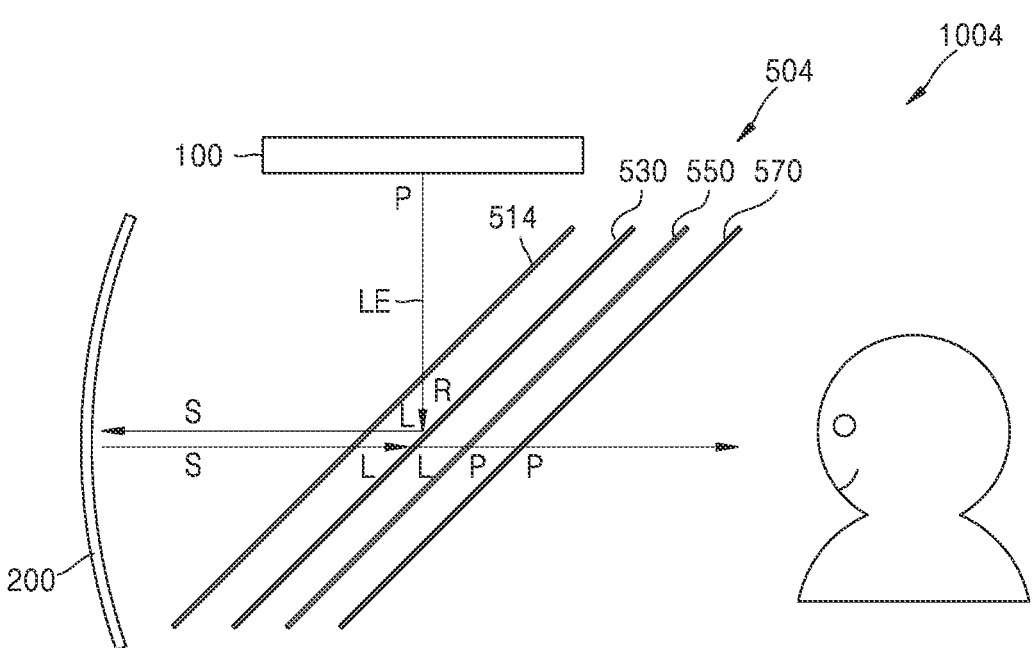
FIG. 8A is a detailed view of an optical path of image light, first noise light, and second noise light, according to the display apparatus of FIG. 7.
Figure 8B:
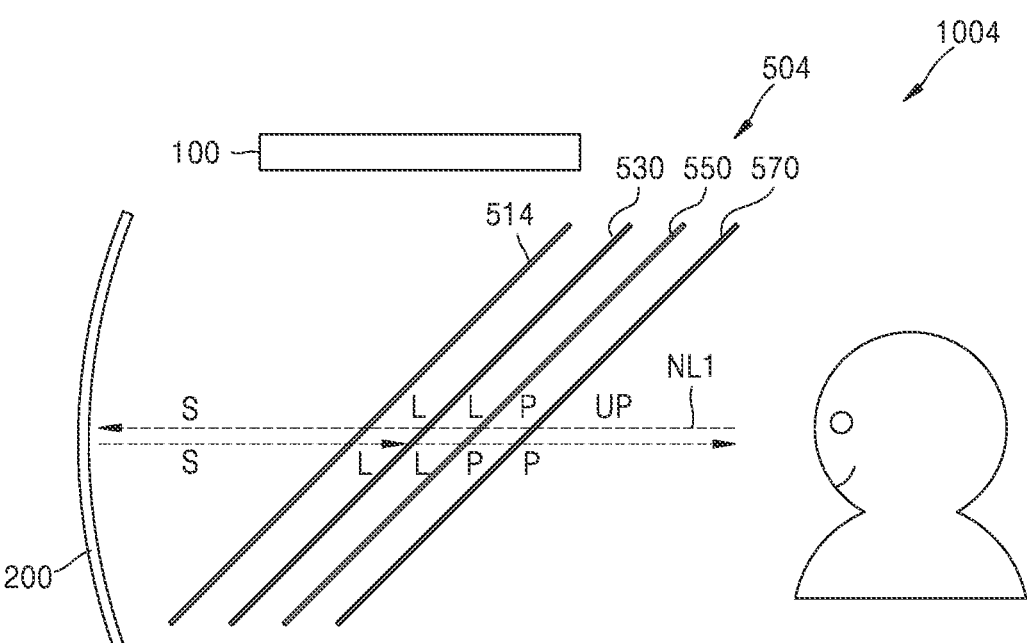
FIG. 8B is a detailed view of an optical path of image light, first noise light, and second noise light, according to the display apparatus of FIG. 7.
Figure 8C:
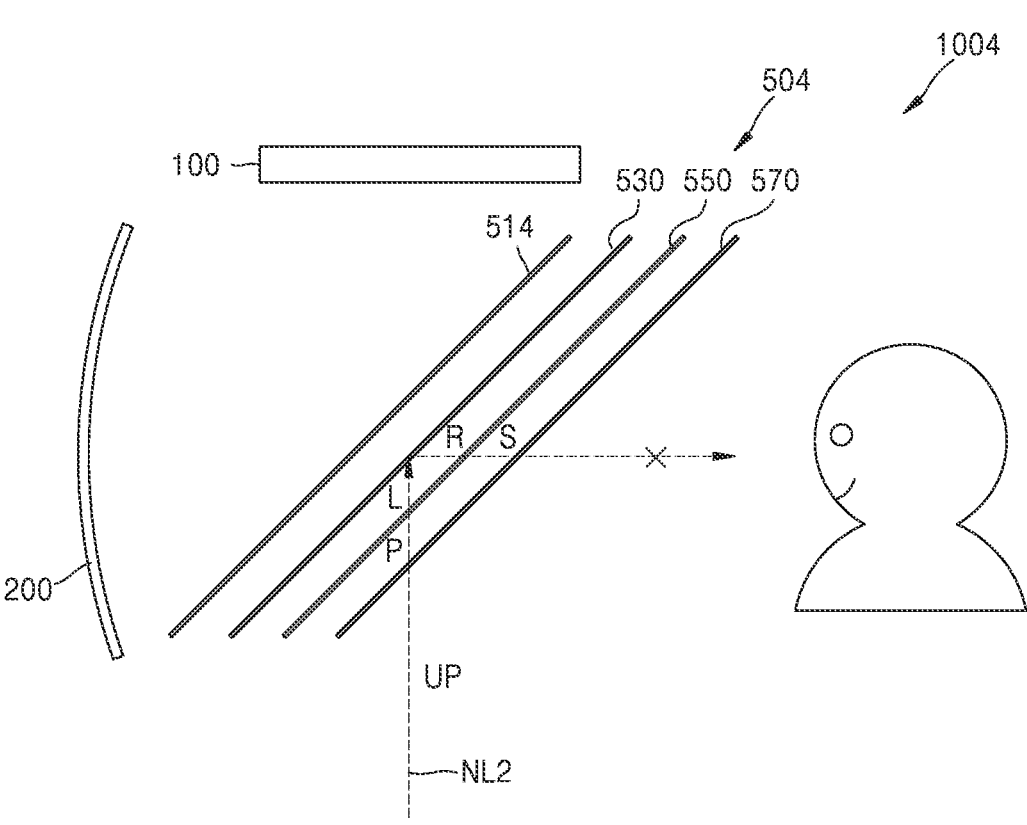
FIG. 8C is a detailed view of an optical path of image light, first noise light, and second noise light, according to the display apparatus of FIG. 7.

FIG. 7 shows a structure of a display apparatus 1004 according to one or more embodiment, and FIG. 8A, FIG. 8B, and FIG. 8C show optical paths of image light LE, first noise light NL1, and second noise light NL2, respectively, according to the display apparatus of FIG. 7.

A display apparatus 1004 includes an image forming device 100, a delivery optical system 504, and a concave mirror 200.

The display apparatus 1004 according to one or more embodiment is different from the display apparatus 1001 of FIG. 3 in the detailed configuration of a first quarter wave plate 514.

The first quarter wave plate 514 is arranged between the image forming device 100 and the beam splitter 530 and may be arranged more adjacent to the beam splitter 530. The first quarter wave plate 514 may be arranged obliquely with respect to an optical axis of the image light LE provided by the image forming device 100; for example, the first quarter wave plate 514 may be arranged at an angle of 45 degrees with respect to the optical axis of the image light LE, but is not limited thereto. The first quarter wave plate 514 may be arranged parallel to the beam splitter 530, but is not limited thereto. In this arrangement, the first quarter wave plate 514 may be located over an optical path along which the image light LE is directed toward the beam splitter 530 and an optical path along which the image light LE is directed toward the concave mirror 200 via the beam splitter 530.

The first quarter wave plate 514 may act as a privacy film for the image forming device 100. As described in one or more embodiment, most of the image light LE provided by the image forming device 100 is delivered to the field of view of the observer via the delivery optical system 501, the delivery optical system 502, and the delivery optical system 503 and the concave mirror 200, but noise that is caused by the image light LE directly entering the field of view of the observer without passing through the concave mirror 200, or by the image forming device 100 that enters itself the field of view of the observer. In one or more embodiment, this type of noise may be minimized by arranging the first quarter wave plate 514 adjacent to and parallel to the beam splitter 530.

In one or more embodiment, the first quarter wave plate 514 may have the same fast axis direction as the second quarter wave plate 550. For example, the first quarter wave plate 514 and the second quarter wave plate 550 may have a fast axis direction of −45°, convert P polarization into right handed circular polarization R, and convert S-polarization into left handed circular polarization L, left handed circular polarization L into P-polarization, and right handed circular polarization R into S-polarization.

Looking at the path of the image light LE with reference to FIG. 8A, the image light LE provided by the image forming device 100 in the first polarization P state passes through the first quarter wave plate 514 and is converted into the right handed circular polarization R state and reaches the beam splitter 530. After being reflected by the beam splitter 530, the image light LE is in the left handed circular polarization L state and is incident on the first quarter wave plate 514 again. Passing through the first quarter wave plate 514, the image light LE reaches the concave mirror 200 in the second polarization S state. Next, when the image light LE is reflected by the concave mirror 200, the state of the second polarization S, which is linear polarization, is maintained and the image light LE is incident on the first quarter wave plate 514, and is converted into the left handed circular polarization L state by the first quarter wave plate 514, and transmits through the beam splitter 530. Next, the image light LE passes through the second quarter wave plate 550 to be in the first polarization P state. As the polarizer 570 transmits light of the first polarization P, the image light LE transmits through the polarizer 570 and is delivered to the field of view of the observer.

FIG. 8B shows a path of the first noise light NL1. Of the first noise light NL1 which is in the unpolarization UP state, that is, in which various polarization states are mixed, only light in the first polarization P state may transmit through the polarizer 570. In this process, a portion of the first noise light NL1 may be blocked from the optical path toward the field of view of the observer. The first noise light NL1 of the first polarization P passes through the second quarter wave plate 550 to be in the left handed circular polarization L state, and transmits through the beam splitter 530. Next, the first noise light NL1 passes through the first quarter wave plate 514 to be in the second polarization S state, and reaches the concave mirror 200. When the first noise light NL1 in the second polarization S state is reflected by the concave mirror 200, the second polarization S state, which is linear polarization, is maintained, and the first noise light NL1 in the second polarization S state passes through the first quarter wave plate 514 again and is converted into the left handed circular polarization L state. Next, the first noise light NL1 in the left handed circular polarization L transmits through the beam splitter 530 and then is converted into the first polarization P state while passing through the second quarter wave plate 550. The first noise light NL1 in the second polarization P state transmits through the polarizer 570 that transmits light of the first polarization P.

FIG. 8C shows a path of the second noise light NL2. Of the second noise light NL2 which is in the unpolarization UP state, that is, in which various polarization states are mixed, only light in the first polarization P state may transmit through the polarizer 570. The second noise light NL2 of the first polarization P passes through the second quarter wave plate 550 and reaches the beam splitter 530 while being in the left handed circular polarization L state. Next, the second noise light NL2 in the left handed circular polarization L state is reflected by the beam splitter 530 to be in the right handed circular polarization R state, and passes through the second quarter wave plate 550 again to be in the second polarization S state. As the polarizer 570 transmits only light of the first polarization P, the second noise light NL2 in the second polarization S state is blocked by the polarizer 570 and does not reach the field of view of the observer.

As described above, compared to the display apparatus 1001 of FIG. 3, in the display apparatus 1004 of one or more embodiment, the first quarter wave plate 514 is arranged in parallel to the beam splitter 530 to block noise light from a direction of the image forming device 100, whereas the first noise light NL1 that started from a position of the observer may partially reach the field of view of the observer.

Similar to the display apparatus 1002 of FIG. 5, to compensate for polarization errors, the display apparatus 1004 of one or more embodiment may be modified to include the second quarter wave plate 552 and the polarizer 572 that are arranged not in parallel to the beam splitter 530 but at a certain angle with respect to the beam splitter 530.

Also, similar to the display apparatus 1003 of FIG. 6, the display apparatus 1004 of one or more embodiment may be modified to further include the phase retarder 520 to compensate for polarization errors.

Figure 9A:
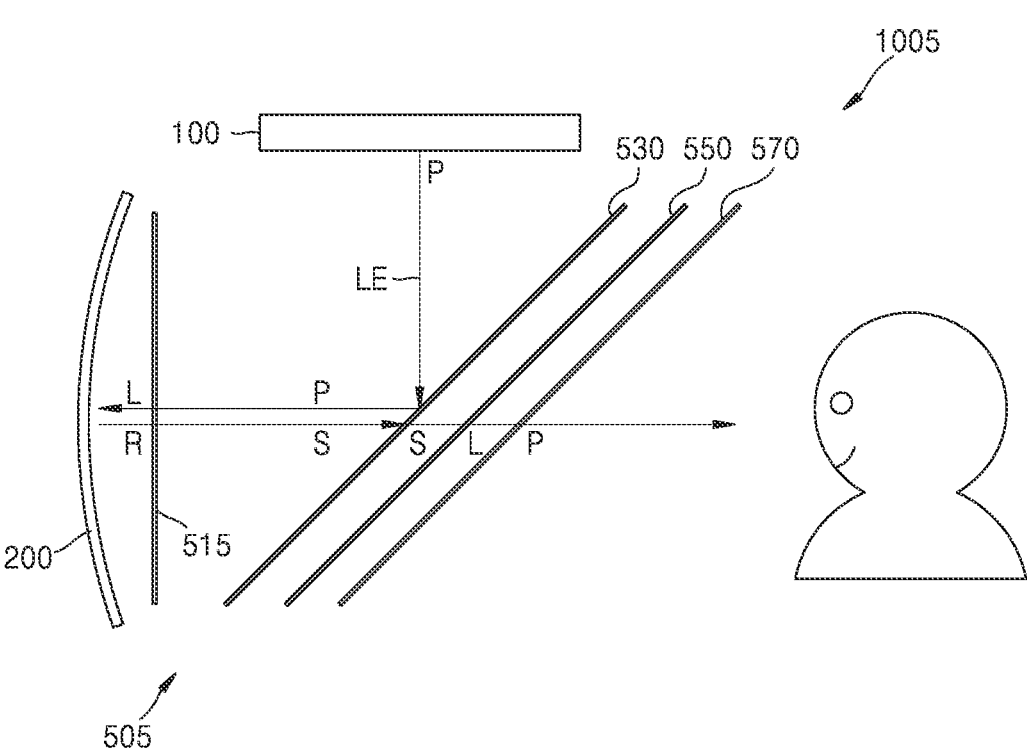
FIG. 9A illustrates a structure of a display apparatus according to one or more embodiments, together with optical paths of image light, first noise light, and second noise light.
Figure 9B:
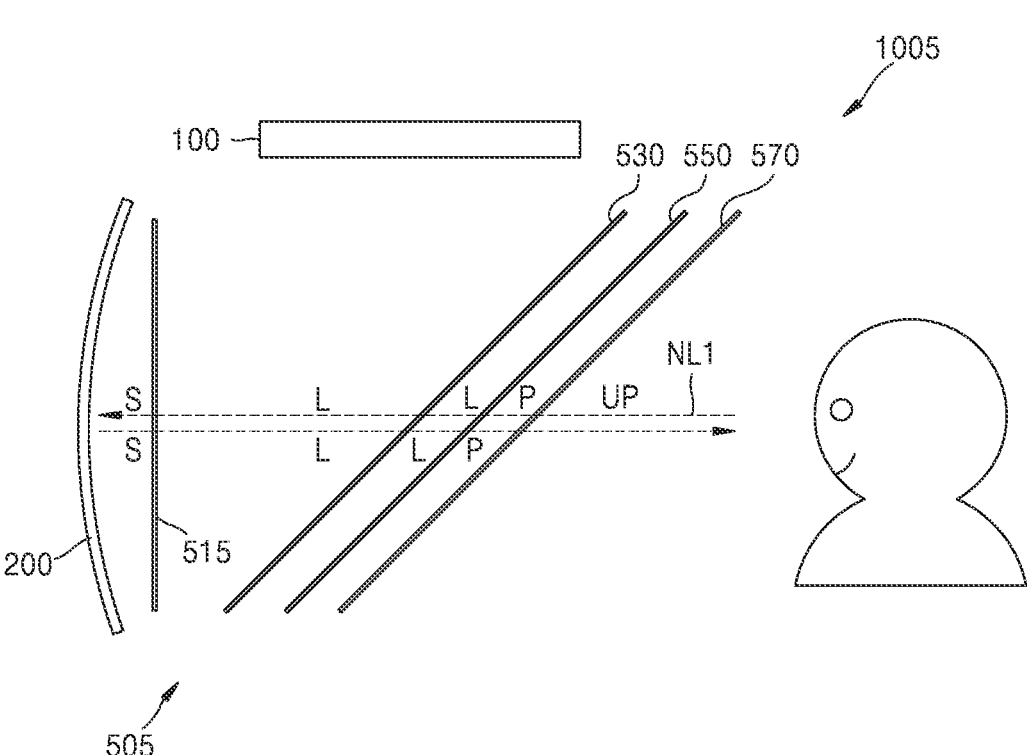
FIG. 9B illustrates a structure of a display apparatus according to an embodiment of the disclosure, together with optical paths of image light, first noise light, and second noise light.
Figure 9C:
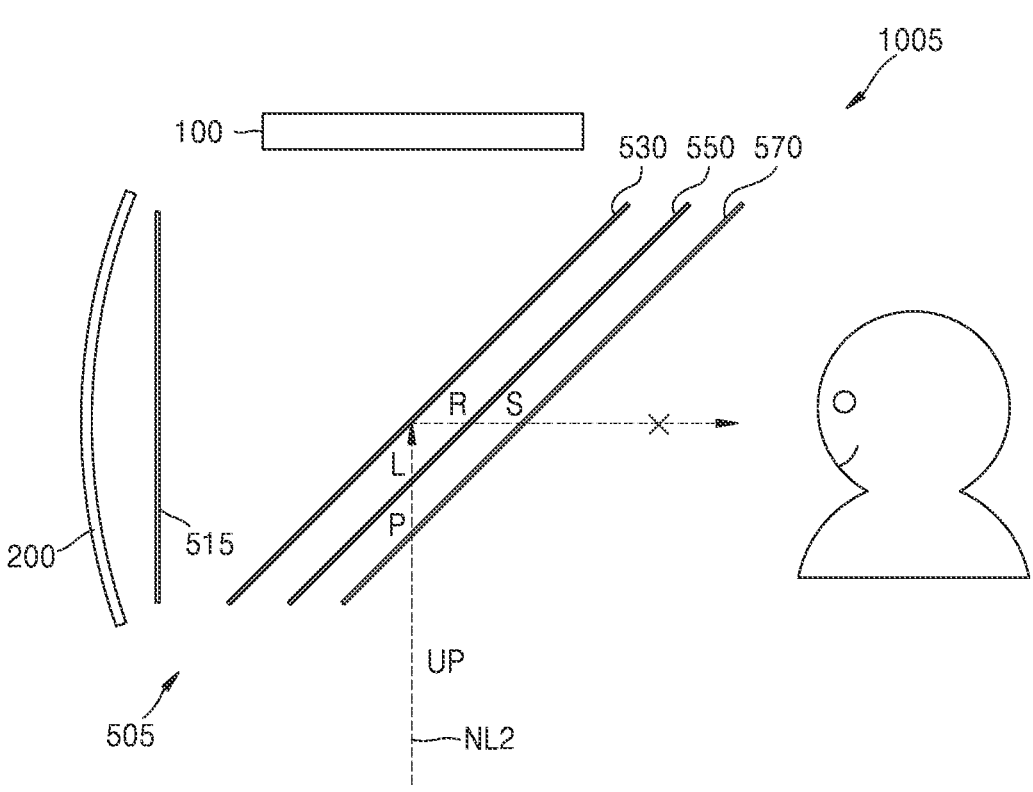
FIG. 9C illustrates a structure of a display apparatus according to an embodiment of the disclosure, together with optical paths of image light, first noise light, and second noise light.

FIG. 9A, FIG. 9B, and FIG. 9C show a structure of a display apparatus 1005 according to one or more embodiment, together with optical paths of image light LE, first noise light NL1, and second noise light NL2, respectively.

A display apparatus 1005 includes an image forming device 100, a delivery optical system 505, and a concave mirror 200. The display apparatus 1005 according to one or more embodiment is different from the display apparatus 1001 of FIG. 3 in respect of the arrangement position of a first quarter wave plate 515. The first quarter wave plate 515 is arranged between the concave mirror 200 and the beam splitter 530. The first quarter wave plate 515 may be arranged in front of the concave mirror 200 such that an optical axis of the first quarter wave plate 515 and an optical axis of the concave mirror 200 are parallel to each other. However, this is an example, and the first quarter wave plate 515 may be arranged such that there is a certain angle between the optical axis of the first quarter wave plate 515 and the optical axis of the concave mirror 200. The first quarter wave plate 515 may also have a fast axis of 45° like the first quarter wave plate 510 described in FIG. 3, that is, may have a perpendicular fast axis direction to the second quarter wave plate 550.

Looking at the path of the image light LE with reference to FIG. 9A, the image light LE in the first polarization P state is reflected by the beam splitter 530 and maintains the first polarization P state, and is incident on the first quarter wave plate 515. The image light LE in the first polarization P state passes through the first quarter wave plate 515 to be in the left handed circular polarization L state, and then is reflected by the concave mirror 200 and is converted into the right handed circular polarization R state and is incident on the first quarter wave plate 515. The image light LE in the right handed circular polarization R state passes through the first quarter wave plate 515 to be in the second polarization S state, and transmits through the beam splitter 530. The image light LE in the second polarization S state passes through the second quarter wave plate 550 to be in the left handed circular polarization L state. The left handed circular polarization L state is a state in which first polarization P and second polarization S are mixed, and among the image light LE incident on the polarizer 570, light in the first polarization P state may transmit through the polarizer 570 and be delivered to the field of view of the observer.

FIG. 9B shows a path of the first noise light NL1. Of the first noise light NL1, which is in the unpolarization UP state, that is, in which various polarization states are mixed, only light in the first polarization P state may transmit through the polarizer 570. In this process, a portion of the first noise light NL1 may be blocked from the optical path toward the field of view of the observer. The first noise light NL1 of the first polarization P passes through the second quarter wave plate 550 to be in the left handed circular polarization L state and transmits through the beam splitter 530. Next, the first noise light NL1 passes through the first quarter wave plate 515 to be in the second polarization S state, and reaches the concave mirror 200. When the first noise light NL1 is reflected by the concave mirror 200, the second polarization S state, which is linear polarization, is maintained, and the first noise light NL1 passes through the first quarter wave plate 515 again to be in the left handed circular polarization L state. Next, the first noise light NL1 in the left handed circular polarization L transmits through the beam splitter 530 and passes through the second quarter wave plate 550 to be in the first polarization P state. The first noise light NL1 in the first polarization P state transmits through the polarizer 570.

FIG. 9C shows a path of the second noise light NL2. Of the second noise light NL2 which is in the unpolarization UP state, that is, in which various polarization states are mixed, only light in the first polarization P state may transmit through the polarizer 570. The second noise light NL2 of the first polarization P passes through the second quarter wave plate 550 to be in the left handed circular polarization L state, and reaches the beam splitter 530. Next, the second noise light NL2 is reflected by the beam splitter 530 to be in the right handed circular polarization R state, and passes through the second quarter wave plate 550 again to be in the second polarization S state. As the polarizer 570 transmits only light of the first polarization P, the second noise light NL2 in the second polarization S state is blocked by the polarizer 570, and does not reach the field of view of the observer.

Similar to the display apparatus 1002 of FIG. 5, to compensate for polarization errors, the display apparatus 1005 of one or more embodiment may be modified to include the second quarter wave plate 552 and the polarizer 572 that are arranged not in parallel to the beam splitter 530 but at a certain angle with respect to the beam splitter 530.

Also, similar to the display apparatus 1003 of FIG. 6, to compensate for polarization errors, the display apparatus 1005 of one or more embodiment may be modified to further include the phase retarder 520.

Figure 10A:
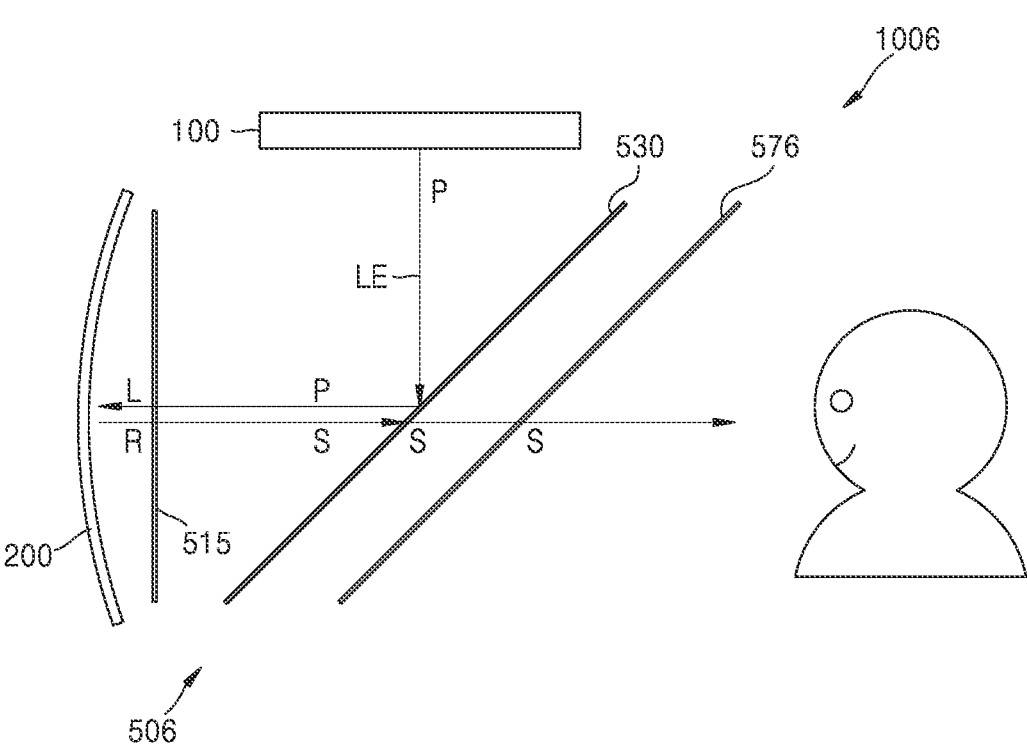
FIG. 10A illustrates a structure of a display apparatus according to one or more embodiments, together with optical paths of image light, first noise light, and second noise light.
Figure 10B:
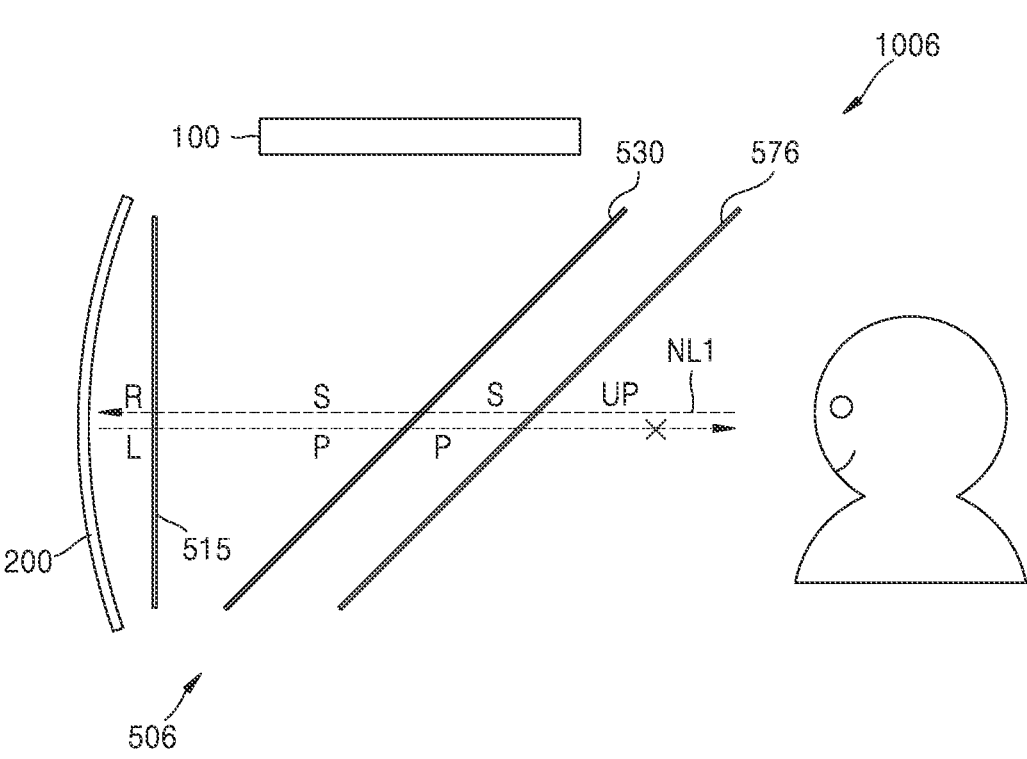
FIG. 10B illustrates a structure of a display apparatus according to an embodiment of the disclosure, together with optical paths of image light, first noise light, and second noise light.
Figure 10C:
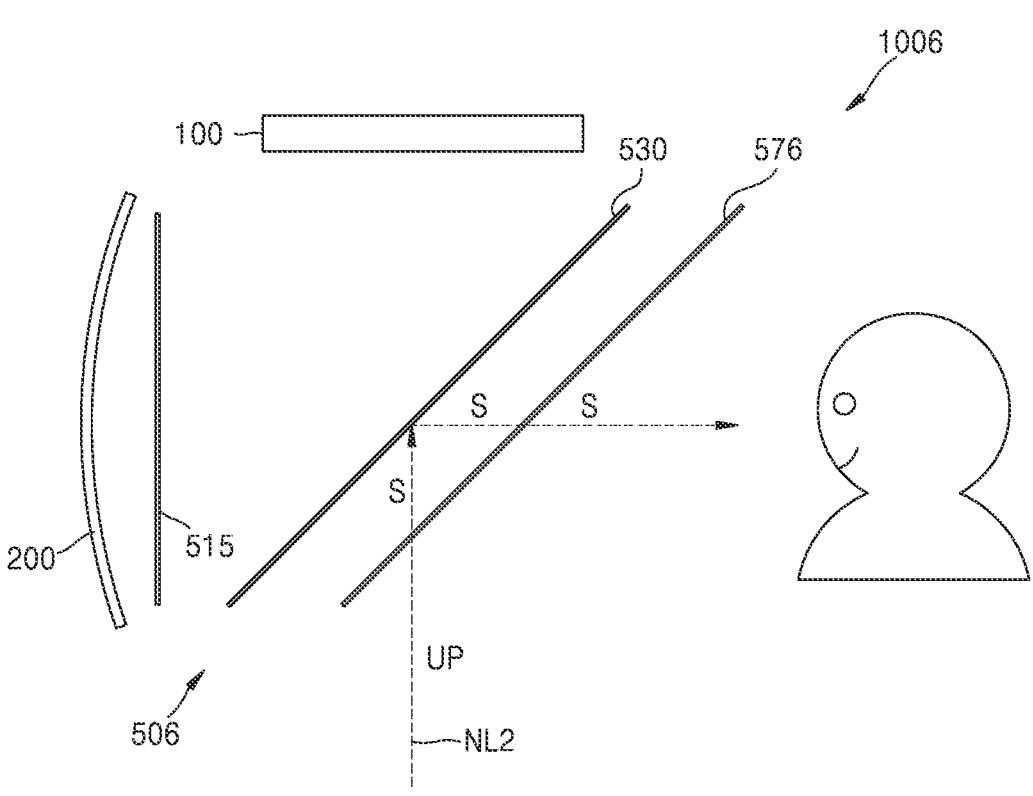
FIG. 10C illustrates a structure of a display apparatus according to an embodiment of the disclosure, together with optical paths of image light, first noise light, and second noise light.

FIG. 10A, FIG. 10B, and FIG. 10C illustrate a structure of a display apparatus 1006 according to one or more embodiment, together with optical paths of image light LE, first noise light NL1, and second noise light NL2, respectively.

A display apparatus 1006 includes an image forming device 100, a delivery optical system 506, and a concave mirror 200. The delivery optical system 506 includes the beam splitter 530, the first quarter wave plate 515, and a polarizer 576. The first quarter wave plate 515 may be arranged between the beam splitter 530 and the concave mirror 200. The first quarter wave plate 515 may be arranged in front of the concave mirror 200 such that an optical axis of the first quarter wave plate 515 and an optical axis of the concave mirror 200 are parallel to each other. The polarizer 576 may transmit light of the second polarization S and block light of the first polarization P.

Looking at the path of the image light LE with reference to FIG. 10A, the image light LE provided by the image forming device 100 in the first polarization P state is reflected by the beam splitter 530, and maintains the first polarization P state, which is linear polarization. Next, the image light LE in the first polarization P state passes through the first quarter wave plate 515 to be in the left handed circular polarization L state, and is reflected by the concave mirror 200 to be in the right handed circular polarization R state. Next, the image light LE in the right handed circular polarization R state passes through the first quarter wave plate 515 again to be in the second polarization S state, and transmits through the beam splitter 530 and is incident on the polarizer 576. As the polarizer 576 transmits light of the second polarization S, the image light LE is delivered to the field of view of the observer.

FIG. 10B shows a path of the first noise light NL1. Of the first noise light NL1 which is in the unpolarization UP state, that is, in which various polarization states are mixed, only light in the second polarization S state may transmit through the polarizer 576. The first noise light NL1 in the second polarization S state transmits through the beam splitter 530, is incident on the first quarter wave plate 515, and passes through the first quarter wave plate 515 to be in the right handed circular polarization R state and reaches the concave mirror 200. The first noise light NL1 in the right handed circular polarization R state is reflected by the concave mirror 200 to be in the left handed circular polarization L state, and passes through the first noise light NL1 515 again and transmits through the beam splitter 530. The first noise light NL1 in the first polarization P state is blocked by the polarizer 576 that transmits only light of the second polarization S, and is not delivered to the field of view of the observer.

FIG. 10C shows a path of the second noise light NL2. Of the second noise light NL2 which is in the unpolarization UP state, that is, in which various polarization states are mixed, only light in the second polarization S state may transmit through the polarizer 576. The second noise light NL2 of the second polarization S is reflected by the beam splitter 530, and maintains the second polarization S state, which is linear polarization. Next, the second noise light NL2, which is in the second polarization S state, transmits through the polarizer 576 to reach the field of view of the observer.

Compared to the display apparatus 1005 described with reference to FIG. 9A, FIG. 9B, and FIG. 9C, the display apparatus 1006 of one or more embodiment has a relatively simpler configuration, but the efficiency of delivering of the image light LE to the field of view of the observer and the efficiency of blocking the first noise light NL1 and the second noise light NL2 from the field of view of the observer may be considered to be similar.

Figure 11A:
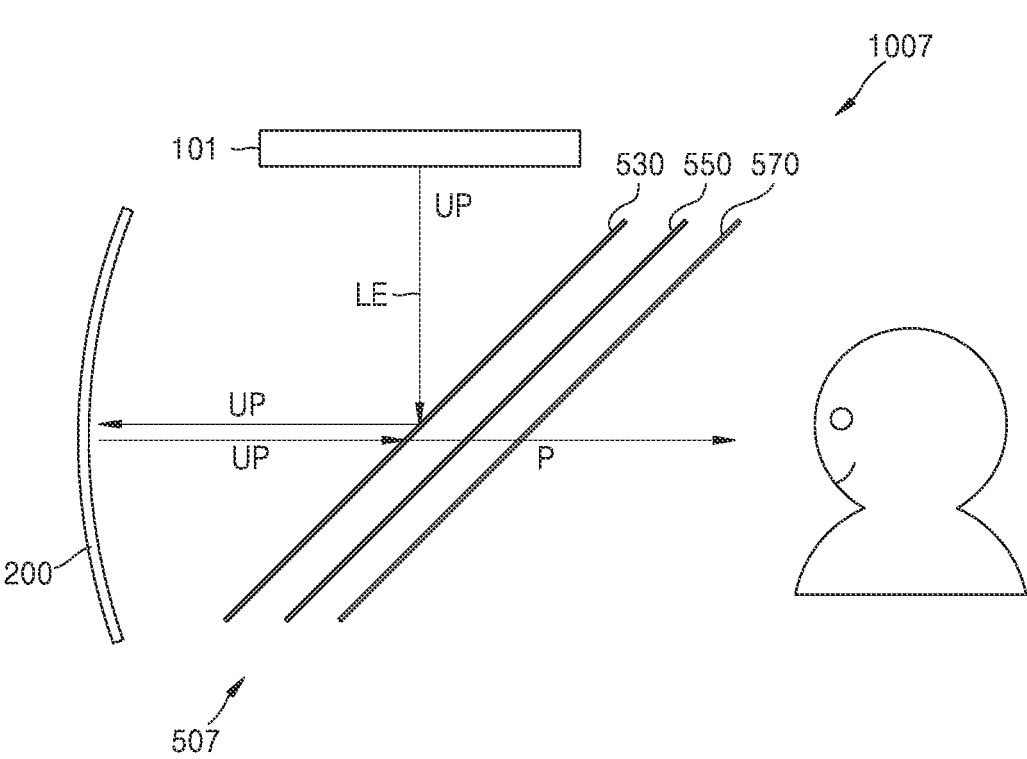
FIG. 11A illustrates a structure of a display apparatus according to one or more embodiments, together with optical paths of image light, first noise light, and second noise light.
Figure 11B:
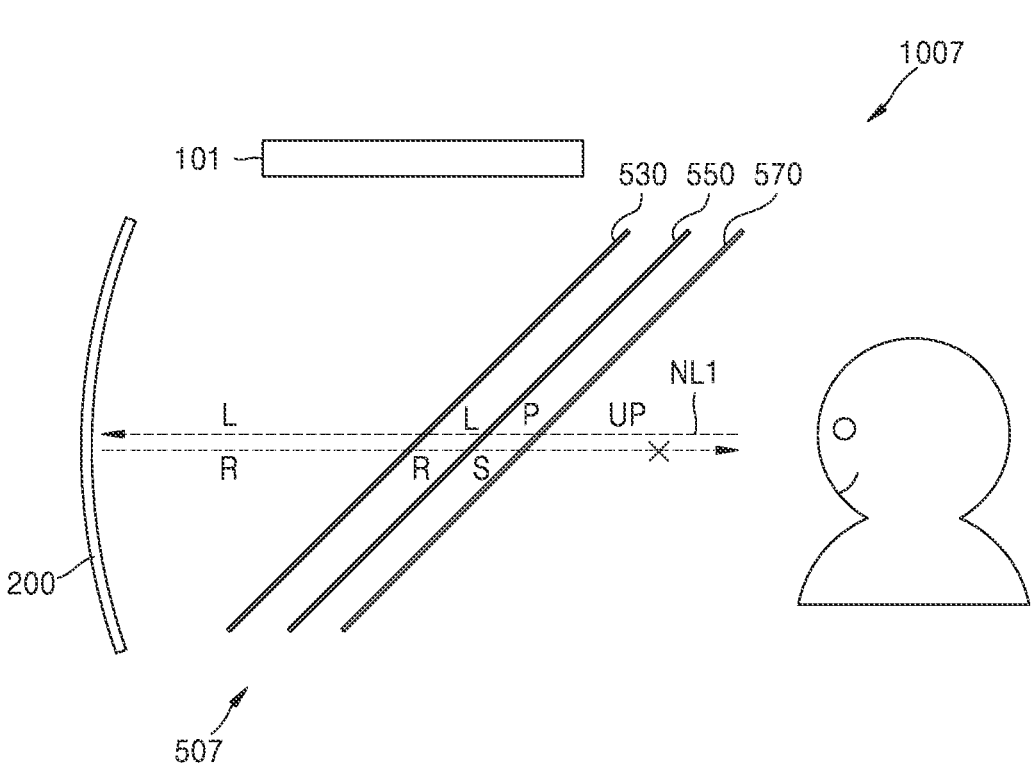
FIG. 11B illustrates a structure of a display apparatus according to one or more embodiments, together with optical paths of image light, first noise light, and second noise light.
Figure 11C:
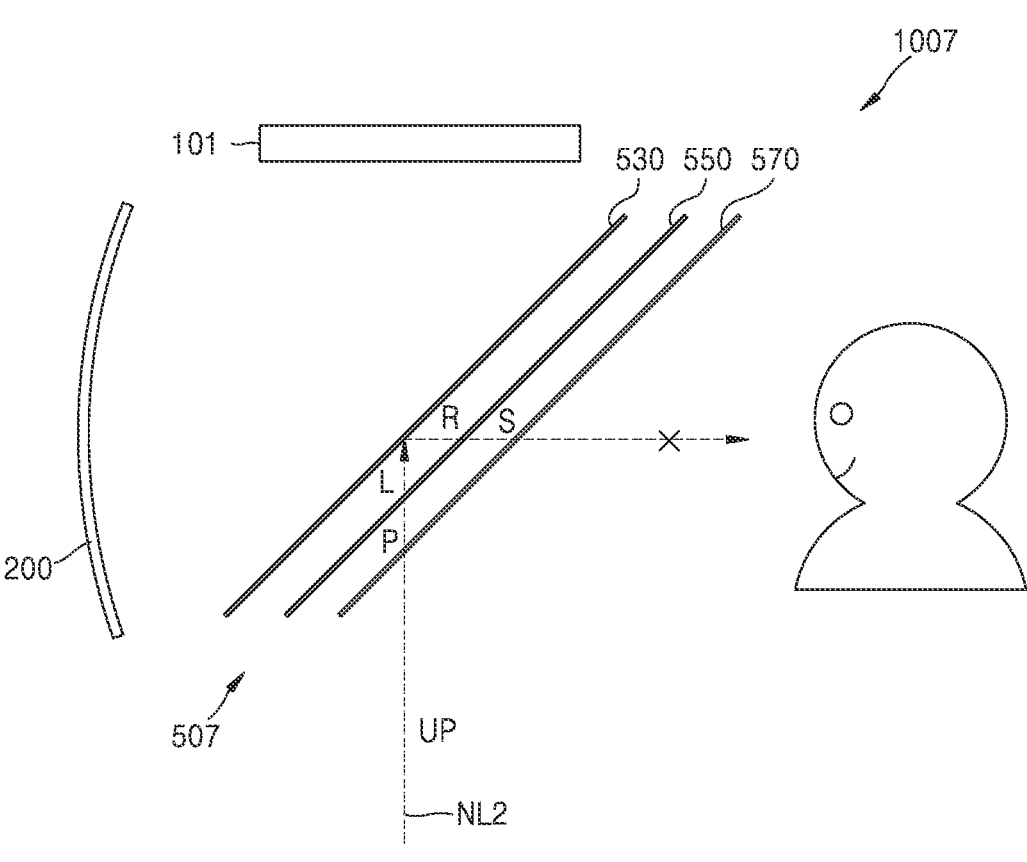
FIG. 11C illustrates a structure of a display apparatus according to one or more embodiments, together with optical paths of image light, first noise light, and second noise light.

FIG. 11A, FIG. 11B, and FIG. 11C show a structure of a display apparatus 1007 according to one or more embodiment, together with optical paths of image light LE, first noise light NL1, and second noise light NL2, respectively.

A display apparatus 1007 includes an image forming device 101, a delivery optical system 507, and a concave mirror 200. In the display apparatus 1007 of one or more embodiment, the image forming device 101 provides the image light LE in the unpolarization UP state, and accordingly, is different from the display apparatus 1001 of FIG. 3 in that no quarter wave plate is arranged between the image forming device 101 and the beam splitter 530.

Referring to FIG. 11A, the image light LE in the unpolarization UP state provided by the image forming device 101 is reflected by the beam splitter 530 toward the concave mirror 200, and then is reflected by the concave mirror 200. In this process, the unpolarization UP state of the image light LE is maintained. The image light LE transmits through the beam splitter 530 and reaches the second quarter wave plate 550. Even after the phase delay by the second quarter wave plate 550, the unpolarization UP state is maintained, and light in the first polarization P state among the image light LE transmits through the polarizer 570 and is provided to the field of view of the observer.

FIG. 11B shows a path of the first noise light NL1. The first noise light NL1 is in the unpolarization UP state, that is, is light in which various polarization states are mixed. Of the first noise light NL1, only light in the first polarization P state may transmit through the polarizer 570. That is, in this process, a portion of the first noise light NL1 is blocked from the optical path toward the observer. The first noise light NL1 of the first polarization P passes through the second quarter wave plate 550 to be in the left handed circular polarization L state and transmits through the beam splitter 530. Next, the first noise light NL1 in the left handed circular polarization L state is reflected by the concave mirror 200, converted into the right handed circular polarization R and transmitted through the beam splitter 530, and the first noise light NL1 in the right handed circular polarization R passes through the second quarter wave plate 550 again to be in the second polarization S state. As the polarizer 570 transmits only light of the first polarization P, the first noise light NL1 in the second polarization S state does not pass through the polarizer 570 and is blocked, and thus does not reach the field of view of the observer.

FIG. 11C shows a path of the second noise light NL2. The second noise light NL2 is also in the unpolarization UP state, that is, is light in which various polarization states are mixed. Of the second noise light NL2, only light in the first polarization P state may transmit through the polarizer 570. In this process, a portion of the second noise light NL2 is blocked from the optical path toward the field of view of the observer. The second noise light NL2 of the first polarization P passes through the second quarter wave plate 550 to be in the left handed circular polarization L state and reaches the beam splitter 530. The second noise light NL2 in the left handed circular polarization L state is reflected by the beam splitter 530 to be in the right handed circular polarization R state, and the second noise light NL2 in the right handed circular polarization R state passes through the second quarter wave plate 550 again to be in the second polarization S state. As the polarizer 570 transmits only light of the first polarization P, the second noise light NL2 in the second polarization S state is blocked by the polarizer 570 and does not reach the field of view of the observer.

Figure 12A:
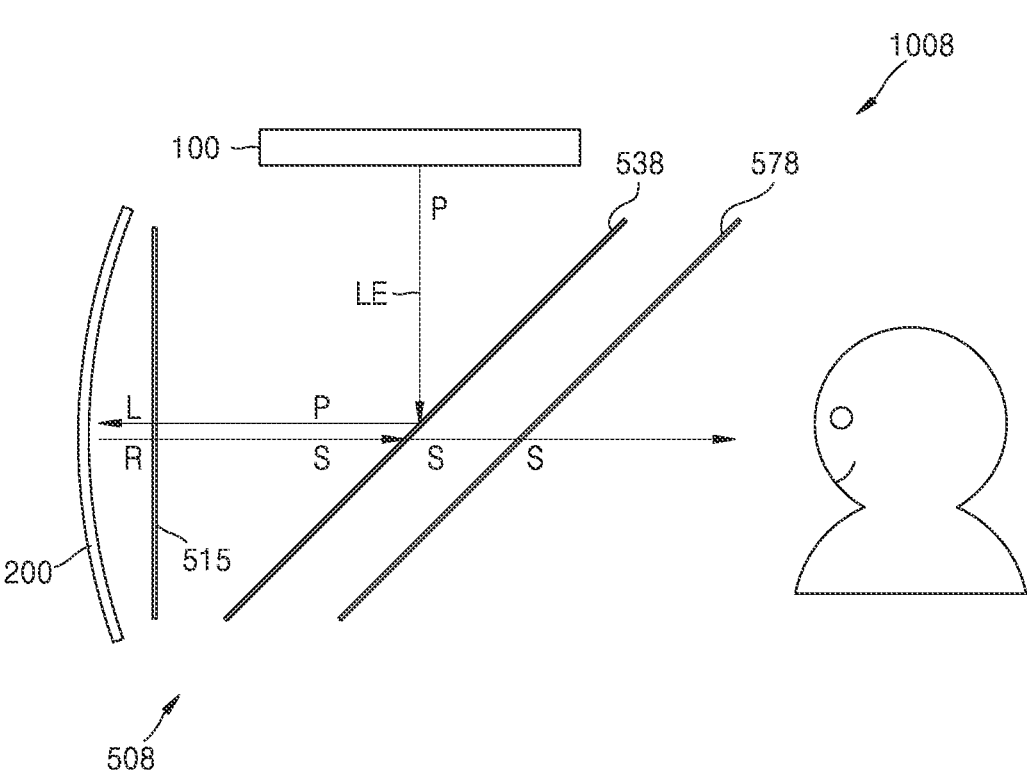
FIG. 12A illustrates a structure of a display apparatus according to one or more embodiments, together with optical paths of image light, first noise light, and second noise light.
Figure 12B:
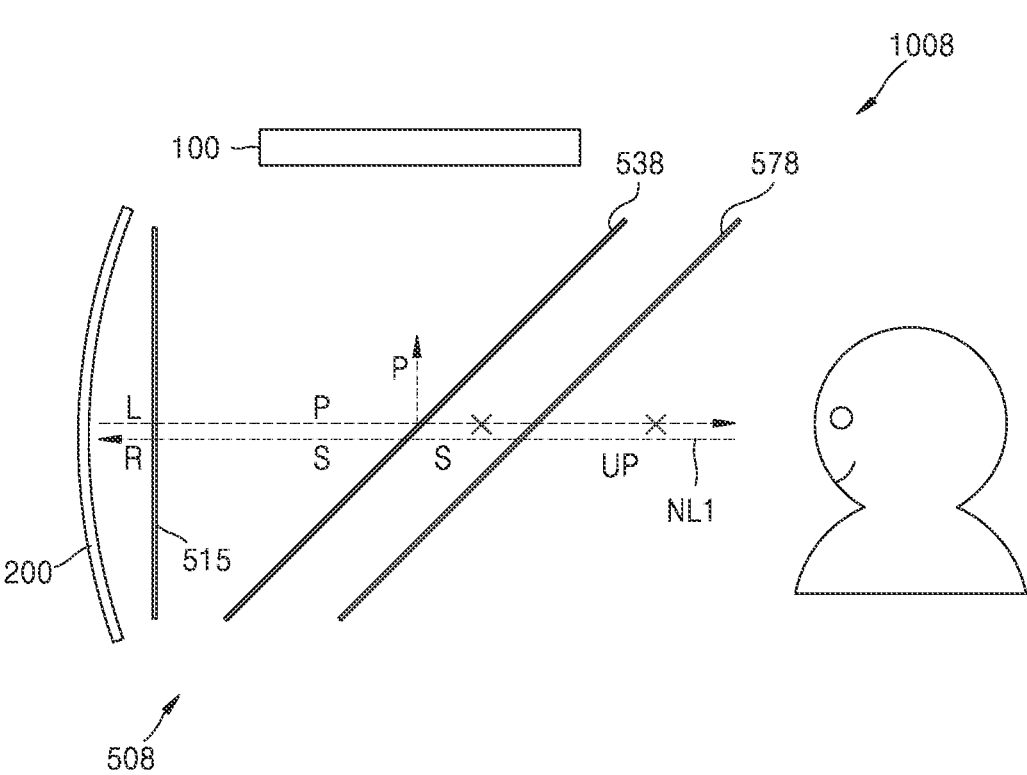
FIG. 12B illustrates a structure of a display apparatus according to an embodiment of the disclosure, together with optical paths of image light, first noise light, and second noise light.
Figure 12C:
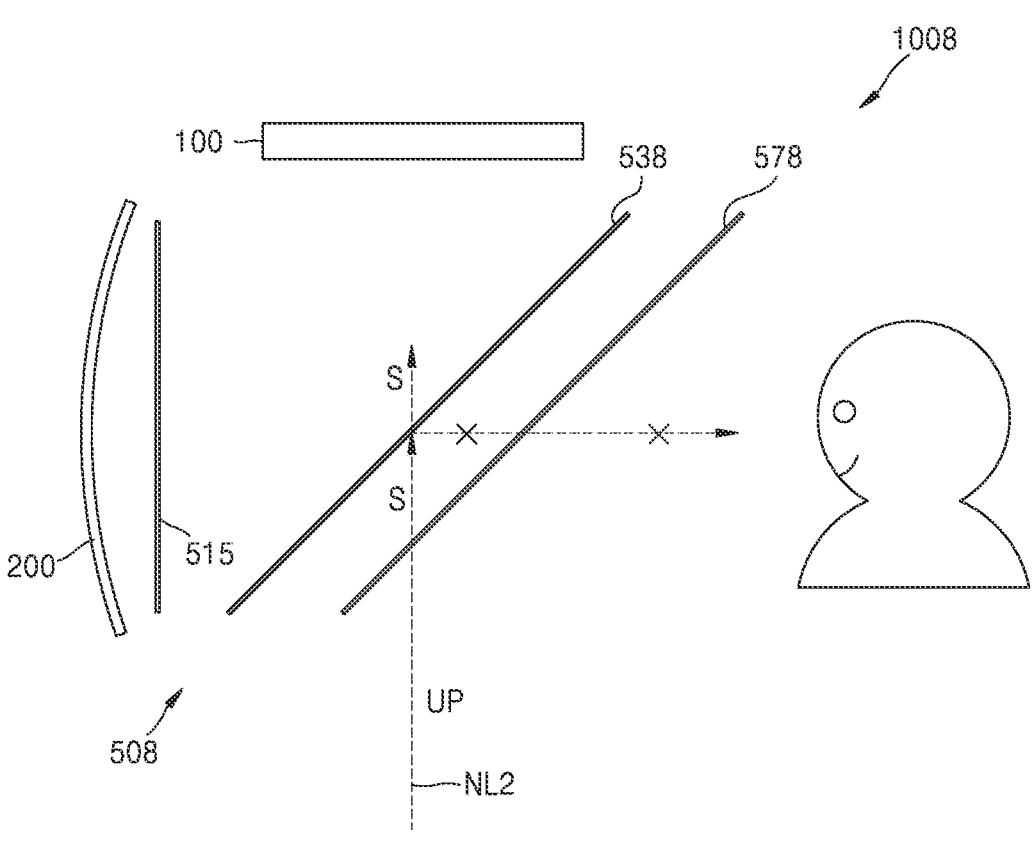
FIG. 12C illustrates a structure of a display apparatus according to one or more embodiments, together with optical paths of image light, first noise light, and second noise light.

FIG. 12A, FIG. 12B, and FIG. 12C illustrate a structure of a display apparatus 1008 according to one or more embodiment, together with optical paths of image light LE, first noise light NL1, and second noise light NL2, respectively.

A display apparatus 1008 includes an image forming device 100, a delivery optical system 508, and a concave mirror 200.

The delivery optical system 508 includes a polarization beam splitter 538, the first quarter wave plate 515, and a polarizer 578. The polarization beam splitter 538 reflects light of the first polarization P, and transmits through light of the second polarization S, which is perpendicular to the first polarization P. The first quarter wave plate 515 is arranged between the polarization beam splitter 538 and the concave mirror 200. The first quarter wave plate 515 may be arranged such that an optical axis of the first quarter wave plate 515 is parallel to an optical axis of the concave mirror 200. The polarizer 578 is arranged between the polarization beam splitter 538 and the observer. The polarizer 578 may transmit light of the second polarization S and block light of the first polarization P.

Referring to FIG. 12A, the image light LE provided by the image forming device 100 in the first polarization P state is reflected by the polarization beam splitter 538 and is incident on the first quarter wave plate 515. The image light LE of the first polarization P passes through the first quarter wave plate 515 to be in the left handed circular polarization L state, and then the image light LE in the left handed circular polarization L state is reflected by the concave mirror 200, and is converted into the right handed circular polarization R state. The image light LE in the right handed circular polarization R state passes through the first quarter wave plate 515 again to be in the second polarization S state, and transmits through the polarization beam splitter 538 that transmits light of the second polarization S, and is incident on the polarizer 578. The polarizer 578 transmits light of the second polarization S, that is, the image light LE of the second polarization S transmits through the polarizer 578 and reaches the field of view of the observer. Loss of the image light LE may hardly occur in this optical path.

FIG. 12B shows a path of the first noise light NL1. The first noise light NL1 is in the unpolarization UP state, that is, is light in which various polarization states are mixed. Of the first noise light NL1, only light in the second polarization S state may transmit through the polarizer 578. The first noise light NL1 of the second polarization S transmits through the polarization beam splitter 538 that transmits the light of the second polarization S, and is incident on the first quarter wave plate 515. The first noise light NL1 in the second polarization S state passes through the first quarter wave plate 515 to be in the right handed circular polarization R state, and is reflected by the concave mirror 200 to be in the left handed circular polarization L state. Next, the first noise light NL1 in the left handed circular polarization L state passes through the first quarter wave plate 515 to be in the first polarization P state, and reaches the polarization beam splitter 538. The polarization beam splitter 538 reflects light of the first polarization P, and thus, the first noise light NL1 in the first polarization P state is reflected by the polarization beam splitter 538, and thus does not head toward the field of view of the observer.

FIG. 12C shows a path of the second noise light NL2. The second noise light NL2 is also in the unpolarization UP state, that is, light in which various polarization states are mixed. Of the second noise light NL2, only light in the second polarization S state may transmit through the polarizer 578. The second noise light NL2 of the second polarization S transmits through the polarization beam splitter 538 that transmits light of the second polarization S. Thus, the second noise light NL2 does not head toward the field of view of the observer.

Figure 13:
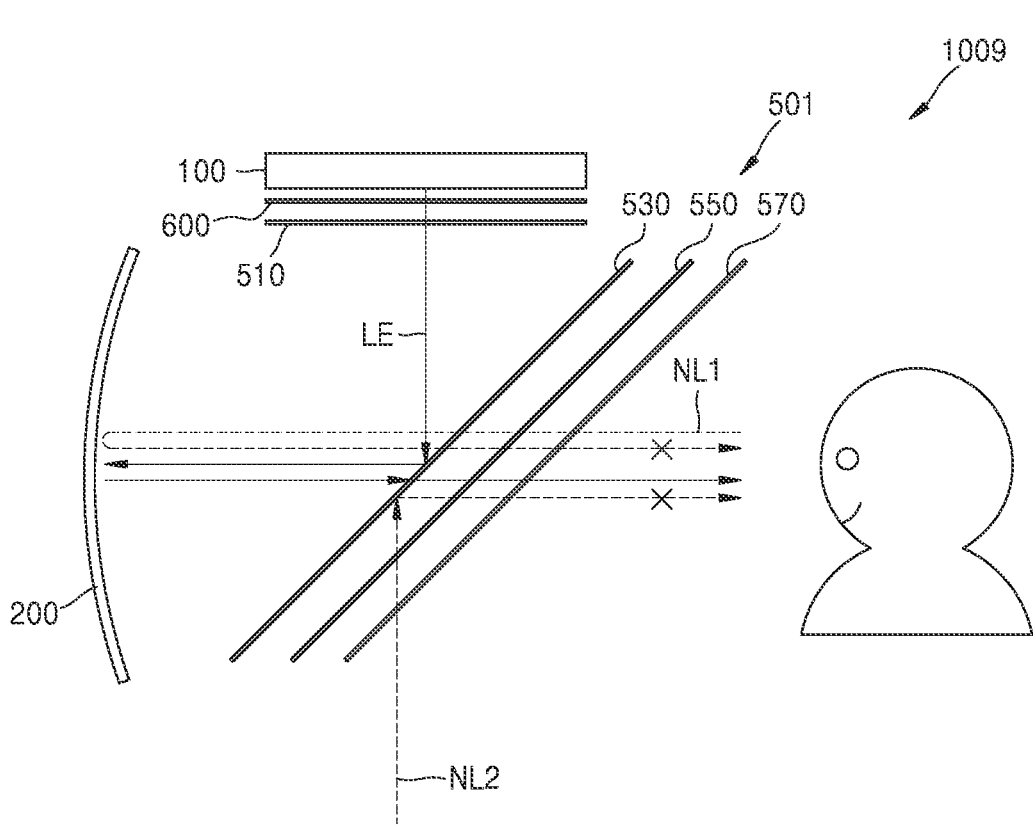
FIG. 13 is a schematic view of a structure of a display apparatus according to one or more embodiments.

FIG. 13 is a schematic view of a structure of a display apparatus 1009 according to one or more embodiment.

A display apparatus 1009 includes the image forming device 100, the delivery optical system 501, and the concave mirror 200. The display apparatus 1009 according to one or more embodiment is different from the display apparatus 1001 of FIG. 3 in that the display apparatus 1009 further includes a privacy film 600. The privacy film 600 may block noise light of a type that is caused as a portion of the image light LE provided by the image forming device 100 enters the field of view of the observer without passing through the concave mirror 200, or caused as the image forming device 100 itself enters the field of view of the observer. The privacy film 600 is illustrated as being arranged between the image forming device 100 and the first quarter wave plate 510, but this is an example and not limited thereto. For example, the privacy film 600 may be included in the image forming device 100 as a component of the image forming device 100 and may be arranged at various positions within the image forming device 100.

The display apparatus 1009 of one or more embodiment is illustrated as corresponding to the display apparatus 1001 illustrated in FIG. 3, which further includes the privacy film 600, but is not limited thereto. Display apparatuses according to one or more embodiment described above may also be modified to further include the privacy film 600.

Figure 14:
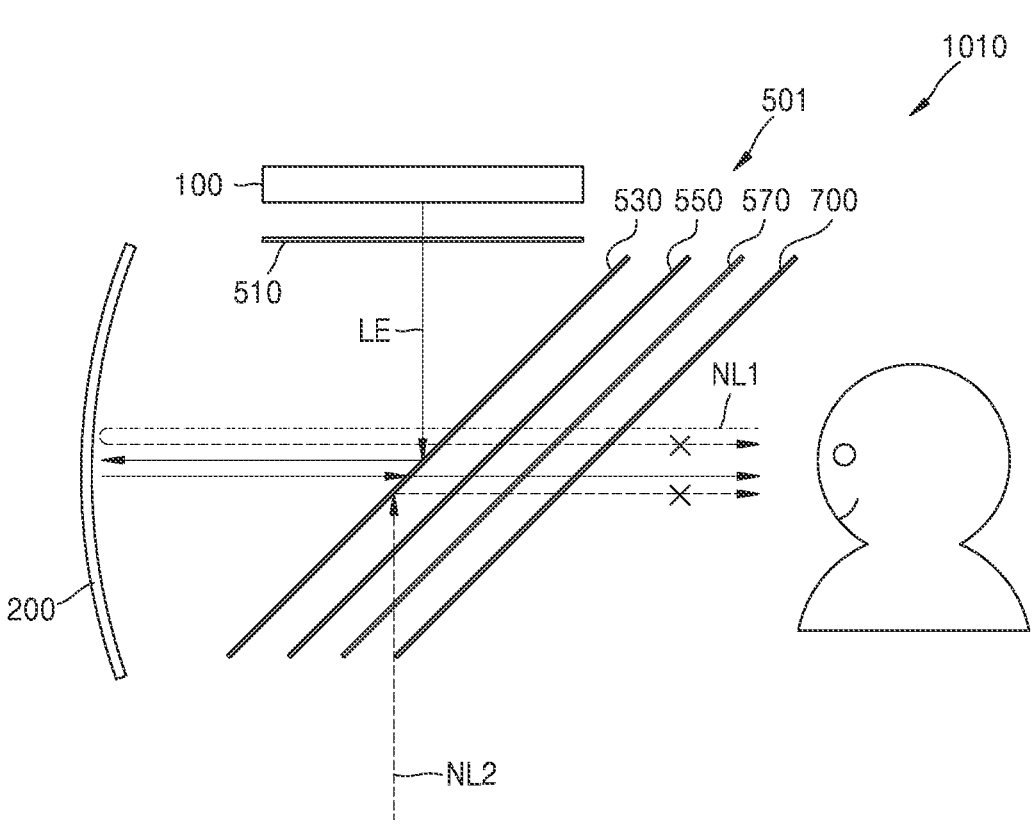
FIG. 14 is a schematic view of a structure of a display apparatus according to one or more embodiments.

FIG. 14 shows a structure of a display apparatus 1010 according to one or more embodiment.

A display apparatus 1010 includes the image forming device 100, the delivery optical system 501, and the concave mirror 200. The display apparatus 1010 of one or more embodiment is different from the display apparatus 1001 of FIG. 3 in that the display apparatus 1010 further includes an anti-reflection film 700. The anti-reflection film 700 prevents, for example, the first noise light NL1 and the second noise light NL2 from being reflected by a plurality of optical elements included in the delivery optical system 500 and entering the field of view of the observer again.

The display apparatus 1010 of one or more embodiment is illustrated as being identical to the display apparatus 1001 illustrated in FIG. 3, which further includes the anti-reflection film 700, but is not limited thereto. The display apparatuses, such as the display apparatus 1001, the display apparatus 1002, the display apparatus 1003, the display apparatus 1004, the display apparatus 1005, the display apparatus 1006, the display apparatus 1007, the display apparatus 1008, and the display apparatus 1009, according to one or more embodiment described above may also be modified to further include the anti-reflection film 700.

The display apparatus 1001, the display apparatus 1002, the display apparatus 1003, the display apparatus 1004, the display apparatus 1005, the display apparatus 1006, the display apparatus 1007, the display apparatus 1008, and the display apparatus 1009 described above may be implemented as a wearable type or a non-wearable type, and may be applied to various fields. For example, the display apparatus 1001, the display apparatus 1002, the display apparatus 1003, the display apparatus 1004, the display apparatus 1005, the display apparatus 1006, the display apparatus 1007, the display apparatus 1008, and the display apparatus 1009 described above may be used in combination with general display apparatuses, televisions, monitors, or the like, and may be applied to various products such as mobile devices, automobiles, heads-up displays, augmented/virtual reality devices, large signage, wearable displays, rollable TVs, and stretchable displays.

According to one or more embodiment, provided is a display apparatus including an image forming device providing image light, a concave mirror focusing the image light provided by the image forming device, and a delivery optical system delivering the image light provided by the image forming device to a field of view of an observer via the concave mirror, the delivery optical system including a beam splitter and one or more polarization control optical elements, wherein the one or more polarization control optical elements are configured to block noise light incident to the delivery optical system from the field of view of the observer.

The image light provided by the image forming device may have a first polarization state which is linear polarization in a first direction.

The delivery optical system may include the beam splitter that is obliquely arranged with respect to a travel path of the image light from the image forming device, a first quarter wave plate arranged between the image forming device and the beam splitter or between the beam splitter and the concave mirror, and a polarizer arranged between the beam splitter and the observer.

The beam splitter may be a half mirror.

The delivery optical system may further include a second quarter wave plate arranged between the beam splitter and the observer.

The polarizer may transmit light of the first polarization and blocks light of second polarization, which is perpendicular to the first polarization.

The first quarter wave plate may be arranged between the image forming device and the beam splitter, in parallel to the image forming device.

The first quarter wave plate 514 may be arranged in parallel to the beam splitter.

The first quarter wave plate 515 may be arranged between the beam splitter and the concave mirror, an optical axis of the first quarter wave plate being in parallel to an optical axis of the concave mirror.

The second quarter wave plate and the polarizer may be arranged at an angle of 0 degree or greater or less than 15 degrees with respect to the beam splitter.

The delivery optical system may further comprise a phase retarder arranged between the concave mirror and the beam splitter.

The polarizer may transmit light of second polarization that is perpendicular to the first polarization, and blocks light of the first polarization.

The first quarter wave plate may be arranged between the beam splitter and the concave mirror, an optical axis of the first quarter wave plate being in parallel to an optical axis of the concave mirror.

The delivery optical system may include a polarization beam splitter that is obliquely arranged with respect to a travel path of the image light from the image forming device, and reflects light of the first polarization, and transmits light of second polarization perpendicular to the first polarization, a first quarter wave plate arranged between the polarization beam splitter and the concave mirror, and a polarizer arranged between the polarization beam splitter and the observer.

The image light provided by the image forming device may be in an unpolarization state, and the delivery optical system may include the beam splitter that is obliquely arranged with respect to a travel path of the image light from the image forming device, a polarizer arranged between the beam splitter and the observer, and a second quarter wave plate arranged between the beam splitter and the polarizer.

The display apparatus may further include a privacy film arranged between the image forming device and the delivery optical system.

The display apparatus may further include an anti-reflection film arranged between the delivery optical system and the observer.

The noise light may be light that is incident from the observer toward the delivery optical system or light incident from the opposite side of the image forming device toward the delivery optical system.

While the disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. For example, each element described as a single type may be distributed, and similarly, elements described to be distributed may be combined.

The display apparatus and method described above have been described with reference to the embodiments shown in the drawings to help understanding, but this is only exemplary, and it will be understood by those of skilled in the art that various modifications and other equivalent embodiments may be made therefrom. The disclosed embodiments should be considered in descriptive sense only and not for purposes of limitation. The scope of the specification is defined not by the detailed description of the disclosure but by the appended claims, and all differences within the scope will be construed as being included in the disclosure.

What is claimed is:

1. A display apparatus comprising:

an image forming device configured to provide image light;

a concave mirror configured to focus the image light provided by the image forming device; and a delivery optical system configured to deliver the image light provided by the image forming device to a field of view of an observer via the concave mirror, wherein the delivery optical system comprises a beam splitter and at least one polarization control optical element, and wherein the at least one polarization control optical element is configured to block noise light incident to the delivery optical system from the field of view of the observer, and the noise light is light that is incident from the observer toward the delivery optical system and incident from at least one of the observer and an opposite side of the image forming device.

2. The display apparatus of claim 1, wherein the image light provided by the image forming device has a first polarization state which is linear polarization in a first direction.

3. The display apparatus of claim 2, wherein the beam splitter is obliquely disposed with respect to a travel path of the image light from the image forming device, and wherein the at least one polarization control optical element comprises:

a first quarter wave plate between the beam splitter and at least one of the image forming device or the concave mirror; and a polarizer between the beam splitter and the observer.

4. The display apparatus of claim 3, wherein the beam splitter comprises a half mirror.

5. The display apparatus of claim 3, wherein the at least one polarization control optical element further comprises a second quarter wave plate between the beam splitter and the observer.

6. The display apparatus of claim 5, wherein the polarizer is configured to transmit light of the first polarization state and to block light of a second polarization state, which is perpendicular to the first polarization state.

7. The display apparatus of claim 6, wherein the first quarter wave plate is between the image forming device and the beam splitter, and parallel to the image forming device.

8. The display apparatus of claim 6, wherein the first quarter wave plate is parallel to the beam splitter.

9. The display apparatus of claim 6, wherein the first quarter wave plate is between the beam splitter and the concave mirror, and wherein an optical axis of the first quarter wave plate is parallel to an optical axis of the concave mirror.

10. The display apparatus of claim 5, wherein the second quarter wave plate and the polarizer are disposed at an angle of less than 15 degrees with respect to the beam splitter.

11. The display apparatus of claim 5, wherein the at least one polarization control optical element further comprises a phase retarder between the concave mirror and the beam splitter.

12. The display apparatus of claim 3, wherein the polarizer is further configured to:

transmit light of a second polarization state that is perpendicular to the first polarization state, and block light of the first polarization state.

13. The display apparatus of claim 12, wherein the first quarter wave plate is between the beam splitter and the concave mirror, and wherein an optical axis of the first quarter wave plate is parallel to an optical axis of the concave mirror.

14. The display apparatus of claim 2, wherein the beam splitter comprises a polarization beam splitter that is obliquely disposed with respect to a travel path of the image light from the image forming device, the polarization beam splitter being configured to reflect light of the first polarization state, and transmit light of a second polarization state that is perpendicular to the first polarization state, and wherein the at least one polarization control optical element comprises:

a first quarter wave plate between the polarization beam splitter and the concave mirror; and a polarizer between the polarization beam splitter and the observer.

15. The display apparatus of claim 1, wherein the image forming device is further configured to provide the image light in an unpolarized state, wherein the beam splitter is obliquely disposed with respect to a travel path of the image light from the image forming device, and wherein the at least one polarization control optical element comprises:

a polarizer between the beam splitter and the observer; and a second quarter wave plate between the beam splitter and the polarizer.

16. The display apparatus of claim 1, further comprising a privacy film between the image forming device and the delivery optical system.

17. The display apparatus of claim 1, further comprising an anti-reflection film between the delivery optical system and the observer.

18. A display apparatus comprising:

an image forming device configured to provide image light;

a concave mirror configured to focus the image light provided by the image forming device; and a delivery optical system configured to deliver the image light provided by the image forming device to a field of view of an observer via the concave mirror, wherein the delivery optical system comprises a beam splitter and at least one polarization control optical element, wherein the at least one polarization control optical element is configured to block noise light incident to the delivery optical system from the field of view of the observer, wherein the image light provided by the image forming device has a first polarization state which is linear polarization in a first direction, wherein the beam splitter is obliquely disposed with respect to a travel path of the image light from the image forming device, and wherein the at least one polarization control optical element comprises:

a first quarter wave plate between the beam splitter and at least one of the image forming device or the concave mirror; and a polarizer between the beam splitter and the observer.

19. A display apparatus comprising:

an image forming device configured to provide image light;

a concave mirror configured to focus the image light provided by the image forming device; and a delivery optical system configured to deliver the image light provided by the image forming device to a field of view of an observer via the concave mirror; and at least one of:

a privacy film between the image forming device and the delivery optical system, and an anti-reflection film between the delivery optical system and the observer, wherein the delivery optical system comprises a beam splitter and at least one polarization control optical element, wherein the at least one polarization control optical element is configured to block noise light incident to the delivery optical system from the field of view of the observer.

\* \* \* \* \*